United States Patent
Marino et al.

(10) Patent No.: US 8,402,109 B2
(45) Date of Patent: Mar. 19, 2013

(54) WIRELESS ROUTER REMOTE FIRMWARE UPGRADE

(75) Inventors: Joseph P. Marino, New York, NY (US); Jonathan Fortin, Montreal (CA)

(73) Assignee: Gytheion Networks LLC, New York, NY (US)

(*) Notice: Subject to any disclaimer, the term of this patent is extended or adjusted under 35 U.S.C. 154(b) by 0 days.

(21) Appl. No.: 13/587,394

(22) Filed: Aug. 16, 2012

(65) Prior Publication Data
US 2013/0013907 A1    Jan. 10, 2013

Related U.S. Application Data

(63) Continuation-in-part of application No. 13/015,053, filed on Jan. 27, 2011, now Pat. No. 8,326,936, which is a continuation of application No. 11/350,905, filed on Feb. 8, 2006, now Pat. No. 7,904,518.

(60) Provisional application No. 60/653,163, filed on Feb. 15, 2005.

(51) Int. Cl.
G06F 15/167    (2006.01)

(52) U.S. Cl. ......... 709/212; 709/201; 709/216; 709/220

(58) Field of Classification Search .................. 709/201, 709/212–216, 220
See application file for complete search history.

(56) References Cited

U.S. PATENT DOCUMENTS

| | | | |
|---|---|---|---|
| 6,321,267 B1 | 11/2001 | Donaldson | |
| 6,701,440 B1 | 3/2004 | Kim et al. | |
| 6,854,007 B1 | 2/2005 | Hammond | |
| 6,941,466 B2 | 9/2005 | Mastrianni | |
| 6,986,049 B2 | 1/2006 | Delany | |
| 7,027,463 B2 | 4/2006 | Mathew et al. | |
| 2002/0007453 A1 | 1/2002 | Nemovicher | |
| 2002/0073304 A1 | 6/2002 | Marsh et al. | |
| 2002/0083156 A1* | 6/2002 | Wysoczynski | 709/219 |
| 2003/0066062 A1 | 4/2003 | Brannock et al. | |
| 2003/0236970 A1 | 12/2003 | Palmer et al. | |
| 2004/0015941 A1 | 1/2004 | Sekine | |
| 2004/0083469 A1 | 4/2004 | Chen et al. | |
| 2004/0107356 A1 | 6/2004 | Shamoon et al. | |
| 2005/0005160 A1 | 1/2005 | Bates et al. | |
| 2005/0021637 A1 | 1/2005 | Cox | |
| 2005/0021968 A1 | 1/2005 | Zimmer et al. | |
| 2005/0027807 A1 | 2/2005 | Fengler et al. | |
| 2005/0039178 A1 | 2/2005 | Marolia et al. | |
| 2005/0055595 A1 | 3/2005 | Frazer et al. | |
| 2005/0097542 A1 | 5/2005 | Lee | |
| 2005/0198160 A1 | 9/2005 | Shannon et al. | |
| 2005/0198173 A1 | 9/2005 | Evans | |
| 2005/0283519 A1 | 12/2005 | Turgeman et al. | |

(Continued)

OTHER PUBLICATIONS

Karim Yaghmour, "9.5 U-Boot" from "Building Embedded Linux Systems", retrieved from <<http://etutorials.org/Linux+systems/embedded+linux+systems/Chapter+9.+Setting+Up+the+Bootloader/9.5+U-Boot/>>, Apr. 2003, 18 pages.

(Continued)

*Primary Examiner* — Phuoc Nguyen
(74) *Attorney, Agent, or Firm* — Oglivie Law Firm

(57) ABSTRACT

A wireless router receives a firmware update from a remote server, and destructively overwrites router firmware in flash memory in a chunk-wise manner, and then writes a kernel memory before going live with upgraded firmware. Some routers authenticate the firmware image. In some cases, image chunks are re-ordered into an executable order after receipt and before finishing their final arrangement in the flash memory. In some routers, a maximum firmware image size is at least two chunk sizes smaller than the flash memory storage capacity. Some routers remap ROM to RAM memory. Some decompress data from flash into a RAM. Some save text file configuration settings in flash before rebooting. Some detect a user's inactive billing status and redirect a web browser to a billing activation page.

20 Claims, 11 Drawing Sheets

U.S. PATENT DOCUMENTS

| | | |
|---|---|---|
| 2005/0289646 A1 | 12/2005 | Zimmer et al. |
| 2006/0004896 A1 | 1/2006 | Nelson et al. |
| 2006/0031319 A1 | 2/2006 | Nelson et al. |
| 2006/0047766 A1 | 3/2006 | Spadea, III |
| 2006/0047920 A1 | 3/2006 | Moore et al. |
| 2006/0053293 A1 | 3/2006 | Zager et al. |
| 2006/0068755 A1 | 3/2006 | Shraim et al. |
| 2006/0069732 A1 | 3/2006 | Shannon et al. |
| 2006/0075028 A1 | 4/2006 | Zager et al. |
| 2006/0143475 A1 | 6/2006 | Herbert et al. |
| 2006/0184635 A1 | 8/2006 | Owen et al. |
| 2007/0274230 A1* | 11/2007 | Werber et al. ............ 370/254 |
| 2008/0156178 A1 | 7/2008 | Georges et al. |

OTHER PUBLICATIONS

"Flash memory", retrieved from <<http://en.wikipedia.org/wiki/Flash_memory>>, Aug. 1, 2012, 12 pages.

"Push technology", retrieved from <<http://en.wikipedia.org/wiki/Push_technology>>, Jul. 30, 2012, 4 pages.

"RealView™ Compilation Tools, Version 2.1, Developer Guide", ARM DUI 0203D, copyright date 2002-2004, 198 pages.

"MANGA KS8695 GNU/Linux 2.6.x: File Release Notes and Changelog", retrieved from <<http://sourceforge.net/project/shownotes.php?group_id=127426&release_id=293127>>, copyright date 2004, 2 pages.

\* cited by examiner

WIRELESS ROUTER REMOTE FIRMWARE UPGRADE

RELATED APPLICATIONS

The present application claims priority to, and incorporates, U.S. patent application Ser. No. 13/015,053 filed Jan. 27, 2011, and U.S. patent application Ser. No. 11/350,905 filed Feb. 8, 2006, which is now U.S. Pat. No. 7,904,518, and U.S. Provisional Patent Application Ser. No. 60/653,163 filed Feb. 15, 2005.

BACKGROUND

To aid understanding of the technical context of the innovations claimed herein, several references are discussed below. This discussion is meant to help promote a full and accurate examination of the claims presented.

However, there are also limits on the inferences one can properly draw from this discussion. These references were identified with the present claims in mind, and the observations made here about the references are likewise guided by the present claims. One of skill would not necessarily have combined any of these references or made such observations without the benefit of hindsight. The mere fact that two or more of the references are discussed here is not evidence of a motivation to combine those references at the time of invention without using the present claims as a blueprint.

Moreover, the inclusion of a reference in this discussion is not a blanket acceptance of every statement made in the reference; what the references recite is not necessarily correct. Each reference must also be considered independently of this discussion to fully understand the reference's teachings, as only a brief space is allotted to any given reference here and each reference speaks for itself. The reference recitations noted here are not meant to be a full description, or even a complete overview or summary, of the teachings of any reference. Other references may also be considered worthy of attention.

Also, a reference may use terms differently than they are used here in describing the innovations claimed, and two different references may use the same term differently. Nor is the inclusion of a reference in this discussion evidence that the reference is enabling with regard to a particular claim, or indeed, with regard to any claim that is presented here.

The following discussion of references begins by pointing out some things that are not present in any of the references. These gaps in the references are worthy of attention, but they are merely examples of how the references could be considered. In particular, it does not follow that something X is present in the references merely because the discussion did not say that X was missing from the references.

Bearing these guidelines in mind, the reference discussion will now proceed.

None of these references mention an "executable order" for "chunks" of a firmware image. None recite "re-ordering" or "re-sequencing" firmware image chunks that were received in some order other than the executable order.

With regard to destructively overwriting flash memory chunks, the only mention of "destructive" in any of these references is in Zimmer (2005/0021968) paragraph [0048] which recites a "non-destructive reset."

None of these references recite a "wireless router" as a device whose firmware will be upgraded. Only Georges (2008/0156178) mentions any of the "802.11" wireless communication standards, and that is not in connection with router firmware upgrades because Georges does not mention "routers" at all.

None of these references mention "checking" to see whether the size of a firmware image is at least two chunk sizes smaller than a device's flash memory storage capacity.

With regard to remapping a ROM memory address to a RAM memory address in the context of a firmware upgrade, only two of the references mention "remapping" an address in any context, namely, Moore, et al. (2006/0047920) and Shamoon, et al. (2004/0107356). However, Moore's Abstract directs attention at how to "enable one-time or few-time programmable memories to work with existing consumer electronic devices (such as those that work with flash—an erasable, non-volatile memory) without requiring a firmware upgrade . . . " (emphasis added). Shamoon directs attention to remapping for security. Shamoon [0310] recites "circuitry which remaps some of the available memory space, so that, in unsecure mode, the CPU cannot address secure memory locations." Shamoon [0312] similarly recites "Some memory space may be rendered off-limits to general purpose uses, for example by remapping".

With regard to writing firmware to both flash memory and a volatile RAM disk, none of these references mention a "RAM disk" or a "RAM drive".

United States Patent Application Publication No. 2003/0066062 by Brannock, et al. recites that a method for updating platform firmware is disclosed. Brannock further recites that this capability is facilitated by a standard software abstraction for a firmware storage device, known as Firmware Volume (FV) that is managed through a Firmware File System (FFS). The FFS enables firmware files to be created, deleted, and updated individually. The FFS also enables a plurality of firmware files to be updated atomically by managing file state information via state bits stored in a file header of each firmware file, whereby an atomic change to a single state bit simultaneously causes the FFS to use an updated set of firmware files in place of an original set of firmware files.

United States Patent Application Publication No. 2004/0083469 by Chen, et al. recites that an update method is used in an optical disk system to update firmware information stored in a firmware memory. Chen further recites that the method includes fetching program code and an update program routine from an update source, storing the program code into a first buffer, storing the update program routine into a second buffer, executing the update program routine stored in the second buffer, writing the program code stored in the first buffer into the firmware memory to update the firmware information, and changing a value of a program counter of the microprocessor such that the microprocessor executes the program code stored in the firmware memory at a predetermined location of the program code instead of executing a next instruction in the program code located after the current position of the program counter, and using the program code as updated firmware information to control the optical disk system.

United States Patent Application Publication No. 2005/0027807 by Fengler, et al. recites that systems and methods for facilitating peripheral device firmware installation are disclosed. Fengler further recites that in one embodiment, a system and a method pertain to transmitting a firmware availability notification, receiving a firmware download request, and transmitting a firmware file to a peripheral device for installation on the peripheral device. In another embodiment, a system and a method pertain to receiving a firmware availability notification with a peripheral device, and providing a related notification to a user, the related notification being provided by the peripheral device.

United States Patent Application Publication No. 2005/0055595 by Frazer, et al. recites that a system for remotely updating software on at least one electronic device connected to a network is disclosed. Frazer further recites that the electronic devices have a non-volatile rewritable storage unit divided into at least two partitions, one of which will contain core firmware and the other of which will contain auxiliary software. When an update is received at the device, the updated core firmware is written to overwrite the partition in the rewritable storage unit that contained the auxiliary software. When this is completed and verified, the previous version of the core firmware stored in the storage unit is disabled from execution by the device. Next, the updated auxiliary software is written to overwrite the old version of the core firmware. When this write is complete, the device determines a suitable time for it to be rebooted to execute the updated software. In another embodiment, the present core firmware in the device is copied from the partition it is in to the other partition, overwriting the auxiliary software stored there. The new core firmware received to update the device is overwritten into the first partition, the old copied core firmware being present in case of an upgrade failure, and upon a successful update of the first partition, the auxiliary software is written to the second partition, overwriting the copied old core firmware. In this manner, the position of the core firmware and auxiliary software within the partitions is preserved during normal operation of the device.

United States Patent Application Publication No. 2008/0156178 by Georges, et al. recites that systems and methods for creating, modifying, interacting with and playing music are provided, particularly systems and methods employing a top-down process, where the user is provided with a musical composition that may be modified and interacted with and played and/or stored (for later play). In an unusually long Abstract which is not fully reproduced here, Georges also recites that the system preferably is provided in a handheld form factor, and a graphical display is provided to display status information, graphical representations of musical lanes or components which preferably vary in shape as musical parameters and the like are changed for particular instruments or musical components such as a microphone input or audio samples. An interactive auto-composition process preferably is utilized that employs musical rules and preferably a pseudo random number generator, which may also incorporate randomness introduced by timing of user input or the like, the user may then quickly begin creating desirable music in accordance with one or a variety of musical styles, with the user modifying the auto-composed (or previously created) musical composition, either for a real time performance and/or for storing and subsequent playback. The remainder of the Abstract may be read in Georges itself.

United States Patent Application Publication No. 2006/0143475 by Herbert, et al. recites that a method according to one embodiment may include: receiving a first encrypted signal at a server of a computing network, the first encrypted signal comprising firmware encrypted by a first encryption algorithm having a first complexity level; sending a second encrypted signal over the computing network to at least one managed client in response to the first encrypted signal, the second encrypted signal comprising the firmware encrypted by a second encryption algorithm having a second complexity level, wherein said first complexity level is greater than said second complexity level; and updating existing firmware of the at least one managed client in response to receipt of the second signal at the at least one managed client. Herbert further recites that many alternatives, variations, and modifications are possible without departing from this embodiment.

United States Patent Application Publication No. 2005/0097542 by Lee recites that a firmware update method is disclosed. First, a tag is written to a firmware storage device. Next, first firmware in the firmware storage device is replaced by second firmware. If the replacing step is successful, the tag is deleted. Before the execution of the second firmware, a verification operation is executed. If the tag is not present, the second firmware is executed. If the tag is present, an abnormity processing procedure is executed. The abnormity processing procedure terminates of execution of the second firmware, reads third firmware via an interface, and replaces the second firmware with the third firmware.

United States Patent Application Publication No. 2005/0039178 by Marolia, et al. recites that aspects of an invention may be seen in a system and method for downloading update packages into an electronic device communicatively coupled to a carrier network. Marolia further recites that the system may facilitate the update of firmware/software in the electronic device. Different protocols may be utilized for discovery and download of update packages. Also, different protocols may be utilized for provisioning and for subsequent downloading of update packages.

United States Patent Application Publication No. 2002/0073304 by Marsh, et al. recites that a system and a method that uses a software application operable under a current firmware/operating system configuration to install a new firmware version without "compromising" the operating system are presented. Marsh further recites that the software application may configure a computer system to install a plurality of software fixes configured to enhance functionality under a new firmware/operating system environment after the firmware has been successfully upgraded. Such functionality enhancements may be associated with external peripherals, as well as, input/output circuit cards, processors, and the like. In addition, the software application may configure the computing device to "boot" under the new firmware/operating system environment upon subsequent system initializations. Furthermore, the software application permits the distribution of firmware upgrades via a network. The capability to install firmware remotely permits a system administrator to "push" the new firmware to a plurality of network coupled computing devices, thus avoiding manual intervention at each device.

United States Patent Application Publication No. 2006/0047920 by Moore, et al. recites that embodiments described therein can be used to enable one-time or few-time programmable memories to work with existing consumer electronic devices (such as those that work with flash—an erasable, non-volatile memory) without requiring a firmware upgrade, thereby providing backwards compatibility while minimizing user impact. Moore further recites that as such, these embodiments are a viable way to bridge one-time or few-time programmable memories with existing consumer electronic devices that have flash card slots. These embodiments also allow future consumer electronic devices to be designed without updating firmware to include a file system customized for a one-time or few-time programmable memory.

United States Patent Application Publication No. 2003/0236970 by Palmer, et al. recites that in a data processing method and system a mass storage device (DASD) of a data processing system is partitioned to include a service partition. Palmer further recites that the service partition is typically located on a portion of the DASD beyond the highest address accessible to the operating system and application programs. The service partition will typically include the current versions of peripheral device firmware, any BIOS extensions, and device drivers. During a system boot, the boot code will invoke a peripheral device call that reports the device's firmware version level to compare the firmware versions of all the peripheral devices against the archived firmware versions stored in the service partition. If a mismatch is detected, the system boot will typically force an update of the peripheral device firmware to the level that is known to be good. Any such firmware updates are recorded in a log that is accessible to system management applications. Any revisions to firmware may be imaged into the service partition so that the revised version will be incorporated into the peripheral device itself during the next subsequent system boot.

United States Patent Application Publication No. 2004/0015941 by Sekine recites that an information-processing apparatus includes a nonvolatile memory device configured to store firmware. Sekine further recites that the information-processing apparatus has a first unit for issuing an instruction to make an operating system execute a shutdown process, and to update the firmware, stored in the nonvolatile memory device, after the operating system has completed the shutdown process. The information-processing apparatus also has a second unit, responsive to the instruction to update the firmware, for updating the firmware only after the operating system has completed the shutdown process.

United States Patent Application Publication No. 2004/0107356 by Shamoon, et al. recites that a novel method and apparatus for protection of streamed media content is disclosed. Shamoon further recites that in one aspect, the apparatus includes control means for governance of content streams or content objects, decryption means for decrypting content streams or content objects under control of the control means, and feedback means for tracking actual use of content streams or content objects. The control means may operate in accordance with rules received as part of the streamed content, or through a side-band channel. The rules may specify allowed uses of the content, including whether or not the content can be copied or transferred, and whether and under what circumstances received content may be "checked out" of one device and used in a second device. The rules may also include or specify budgets, and a requirement that audit information be collected and/or transmitted to an external server. In a different aspect, the apparatus may include a media player designed to call plugins to assist in rendering content. A "trust plugin" is disclosed, along with a method of using the trust plugin so that a media player designed for use with unprotected content may render protected content without the necessity of requiring any changes to the media player. In one aspect, the streamed content may be in a number of different formats, including MPEG-4, MP3, and the RMFF format.

United States Patent Application Publication No. 2005/0021968 by Zimmer, et al. recites that a method for providing a secure firmware update is disclosed. This Zimmer application further recites that a first authentication credential is securely stored on a platform in an encrypted form using a key generated by a secure token, such as a trusted platform module (TPM). Typically, the authentication credential will identify a manufacture and the operation will be performed during manufacture of the platform. A configuration of the platform is "imprinted" such that an identical configuration is required to access the key used to decrypt the first authentication credential by sealing the key against the platform configuration. During a subsequent firmware update process, a firmware update image containing a second authentication credential is received at the platform. If the platform configuration is the same as when the key was sealed, the key can be unsealed and used for decrypting the first authentication credential. A public key in the first authentication credential can then be used to authenticate the firmware update image via the second authentication credential.

United States Patent Application Publication No. 2005/0289646 by Zimmer, et al. recites disclosure of a method of copying virtual firmware smart card code from a first secured memory in a system and loading the virtual firmware smart card code into a second secured memory in the system so that the code may be run on a microprocessor to provide smart card services to the system.

SUMMARY

Various systems/devices and methods for remotely updating router firmware are described herein. For example, some embodiments provide a method for upgrading a wireless router. A flash memory in the wireless router contains a first version of router firmware. The router firmware includes instructions to be executed by a processor of the wireless router, and the firmware also includes data. The wireless router sends a request for a firmware update, the request being sent from the wireless router over a network connection toward a server. The wireless router receives over the network connection a response to the request for a firmware update, the response including at least a firmware image for a second version of router firmware which differs from the first version of router firmware by reason of containing at least one firmware change (a firmware change being a difference in firmware data and/or a difference in firmware instructions). The firmware image includes a plurality of chunks, each chunk having a size which is no greater than a predetermined chunk size. The wireless router destructively overwrites the first version of router firmware in the flash memory with the second version of router firmware. The destructive overwriting proceeds in a chunk-wise manner such that prior to being overwritten by all of the chunks the flash memory contains neither a complete copy of the first version nor a complete copy of the second version of the router firmware. The wireless router is configured to run whatever version of router firmware is in the router's flash memory after being rebooted. The wireless router reboots, thereby making the firmware change(s) go live.

Some embodiments include writing the flash memory and then writing a kernel memory. That is, the wireless router destructively overwrites the first version of router firmware in the flash memory with the second version of router firmware, and then writes a copy of content of the second version of router firmware to a kernel memory in a volatile RAM memory in the wireless router before going live with upgraded firmware.

Some embodiments include writing both flash memory and a volatile RAM disk. That is, the wireless router destructively overwrites the first version of router firmware in the flash memory with the second version of router firmware, and also writes a copy of content of the second version of router firmware to a RAM disk in a volatile RAM memory of the router.

In some embodiments, the firmware image chunks have at least one predetermined executable order, namely, an order in which the chunks are arranged in an executable copy of the firmware image. The step of receiving a responsive firmware image receives the chunks in a volatile RAM memory in the wireless router in an order which differs from the executable order, and the method includes re-ordering the chunks such that the step of destructively overwriting flash memory chunks arranges chunks in the flash memory in the executable order.

In some embodiments, the firmware image has a size and the flash memory has a storage capacity. The method includes the wireless router checking to see whether the size of the firmware image is less than a predetermined maximum firmware image size. The predetermined maximum firmware image size is at least two chunk sizes smaller than the flash memory storage capacity.

Some embodiments include the wireless router remapping a ROM memory address in the router to a RAM memory address in the router. Some include the wireless router decompressing data held within the flash memory in the router and copying the data to a RAM-based file system in the router; some include both steps.

In some embodiments, before going live with upgraded firmware, the wireless router overwrites at least a portion of the flash memory with user-definable configuration settings from a text file. Then after going live with upgraded firmware, the wireless router overwrites the text file with the configuration settings from the flash memory.

In some embodiments, the response received by the wireless router includes an indication that a billing status is inactive, and the method includes redirecting a web browser to a billing activation page.

In some embodiments, the firmware image chunks have at least one predetermined executable order, namely, an order in which the chunks are arranged in an executable copy of the firmware image. The step of receiving a responsive firmware image receives the chunks in the wireless router in an order which differs from the executable order. The method includes re-ordering the chunks such that the step of destructively overwriting flash memory chunks arranges chunks in the flash memory in the executable order. The method also includes writing a copy of the chunks to a kernel memory in the wireless router.

Some embodiments described herein provide a remotely upgradable wireless router. The wireless router includes a processor, volatile RAM memory, a network interface card, a wireless link interface, and a flash memory. The volatile RAM memory is in operable communication with the processor and contains a kernel. The kernel includes data and including instructions which upon execution by the processor at least partially control operation of the wireless router. In particular, the kernel contains a flash memory device driver. The network interface card is connectable to a TCP/IP network such as the Internet for two-way data communication of the wireless router with a remote server. The network interface card is also in operable communication with the volatile RAM memory. The wireless link interface is connectable to a wireless network for two-way data communication of the wireless router with a local computer, and is also in operable communication with the volatile RAM memory. The flash memory is in operable communication with the processor by use of the flash memory device driver. The flash memory contains a version of wireless router firmware, which includes data, also includes and instructions which upon execution by the processor at least partially control operation of the wireless link interface.

In some embodiments, the wireless router is further characterized in that upon execution of at least some of the instructions by the processor, the wireless router will do the following: send a request for a firmware update over the network interface card to the remote server, receive over the network interface a wireless router firmware image, write content of the wireless router firmware image to the flash memory, write content of the wireless router firmware image to the kernel memory after writing the content to the flash memory, and then reboot, thereby passing control to at least some of the wireless router firmware content that was written to the flash memory. In some embodiments, the wireless router does not necessarily send a request for a firmware update, but may instead receive the firmware update without having first requested it.

In some embodiments, the flash memory has a storage capacity, and the wireless router firmware image includes a plurality of chunks, each chunk having a size which is no greater than a predetermined chunk size and is less than one-eighth the flash memory storage capacity. The wireless router upon execution of at least some of the instructions by the processor destructively overwrites the version of wireless router firmware in the flash memory in a chunk-wise manner with chunks of the wireless router firmware image.

In some embodiments, the wireless router firmware image includes a plurality of chunks which have at least one predetermined executable order, namely, an order in which the chunks are arranged in an executable copy of the wireless router firmware image. The wireless router upon execution of at least some of the instructions by the processor receives the chunks in the RAM memory in an order which differs from the executable order, and re-orders chunks to arrange the chunks in the flash memory in the executable order.

In some embodiments, the remotely upgradable wireless router includes a ROM memory address remapped to a RAM memory address in the router. In some, the wireless router is joined with a text file containing user-defined configuration settings, and the flash memory contains a copy of the user-defined configuration settings.

In some embodiments, the wireless router firmware image has a size and the flash memory has a storage capacity. The wireless router firmware image includes a plurality of chunks. Each chunk has a size which is no greater than a predetermined chunk size and is less than one-eighth the flash memory storage capacity. The size of the wireless router firmware image is at least two chunk sizes smaller than the flash memory storage capacity.

In some embodiments, the wireless router upon execution of at least some of the instructions by the processor performs authentication to verify validity of the wireless router firmware image.

In some embodiments, the wireless link interface conforms with at least one 802.11 standard for wireless communications. In some, the wireless router includes a 10/100 Mbps local area network interface card to provide a data communication connection to a local area network, and the kernel includes instructions which upon execution by the processor at least partially control operation of the local area network interface card. In some embodiments, the kernel includes open source operating system code.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Observations on Focus

Figure 1:
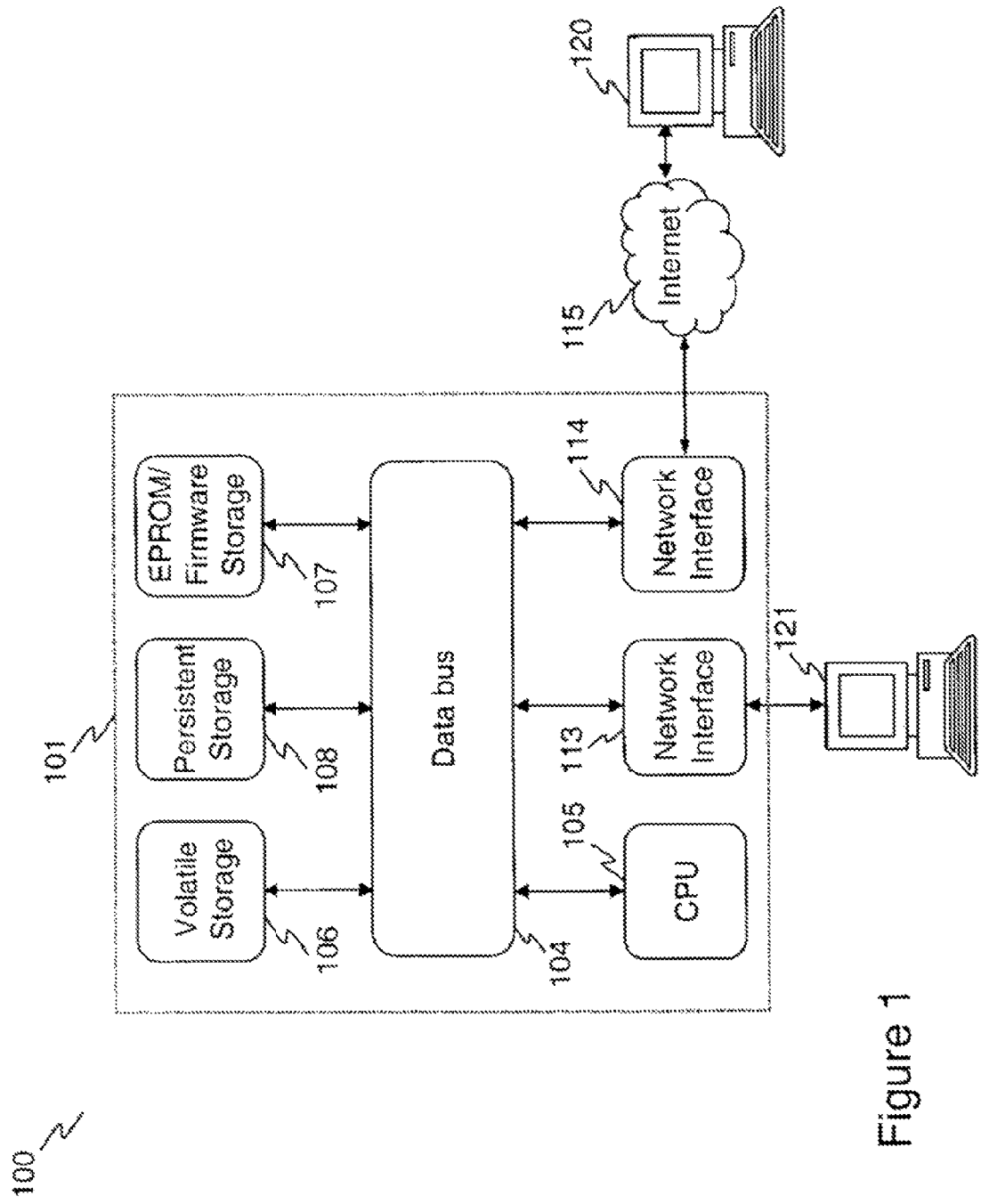
FIG. 1 depicts a schematic diagram of a system and device for processing network content.

It is not unusual for a child application to set forth claims which have a different focus than the claims of a parent application. In the present situation, provisional application No. 60/653,163 contains 148 pages of a disclosure which was incorporated and built upon in the application that ultimately issued as U.S. Pat. No. 7,904,518. The present document incorporates and builds upon both those ancestor applications. Claims of the '518 patent focus in part on filtering email message content, but the underlying applications are not limited to that topic. The claims presented here are differently focused than the '518 patent claims, but an attentive reader will find common subject matter in the three applications. For example, the present document is titled "Wireless Router Remote Firmware Upgrade," the '163 provisional discusses a Remote Flash Updater utility capable of writing firmware to flash memory, and the '518 patent Abstract states that an "appliance is provided with an automatic remote updating capability, wherein the software and data used by the appliance can be updated remotely via a network." The '518 patent also teaches that some embodiments of the appliance include functionality of a network hub or router.

Observations on Meaning and Scope

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, in a given reference document discussing others' work, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to their own lexicography. Terms may be defined, either explicitly or implicitly, here in the Detailed Description and/or elsewhere in the application file.

Reference will be made to the accompanying drawings. The drawings show by way of illustration, and not by way of limitation, specific embodiments and implementations consistent with principles and possibilities presented herein. The mere fact that the same reference number is used in two places in the figures and/or the text does not imply that the referenced item is identical in every respect in each instance. For example, appliance 101 shown in FIG. 1 is not necessarily identical in every respect with appliance 101 shown in FIG. 2A, or with appliance 101 shown in FIG. 2B, and so on. The various implementations are described in sufficient detail to enable those skilled in the art to practice the invention and it is to be understood that other implementations may be utilized and that structural changes and/or substitutions of various elements may be made without departing from the scope and spirit of the claimed invention. The description is, therefore, not to be construed in a limited sense. Additionally, various embodiments described may be implemented in the form of a software running on a general purpose computer, in the form of a specialized hardware, or combination of software and hardware, except as otherwise required by the claim being considered.

Throughout this document, use of the optional plural "(s)" means that one or more of the indicated feature is present. For example, the term "firmware change(s)" means "one or more firmware changes" or equivalently "at least one firmware change".

As used herein, "overwriting" a memory means overwriting at least a portion of the memory. That is, overwriting a memory allows overwriting the entire memory, but does not require overwriting the entire memory.

As used herein, "updating" and "upgrading" are used interchangeably.

As used herein, a "chunk" of flash memory is the smallest amount of memory that is overwritten to perform a single flash memory write. In a typical flash memory, chunk size is 128 Kbytes, but different vendors may use different chunk sizes. A flash memory chunk is sometimes called a "block," but care is called for because attention to context reveals that the word "block" is also used in other ways, e.g., in discussing filesystem data structures.

Remote Flash Updater

Figure 7A:
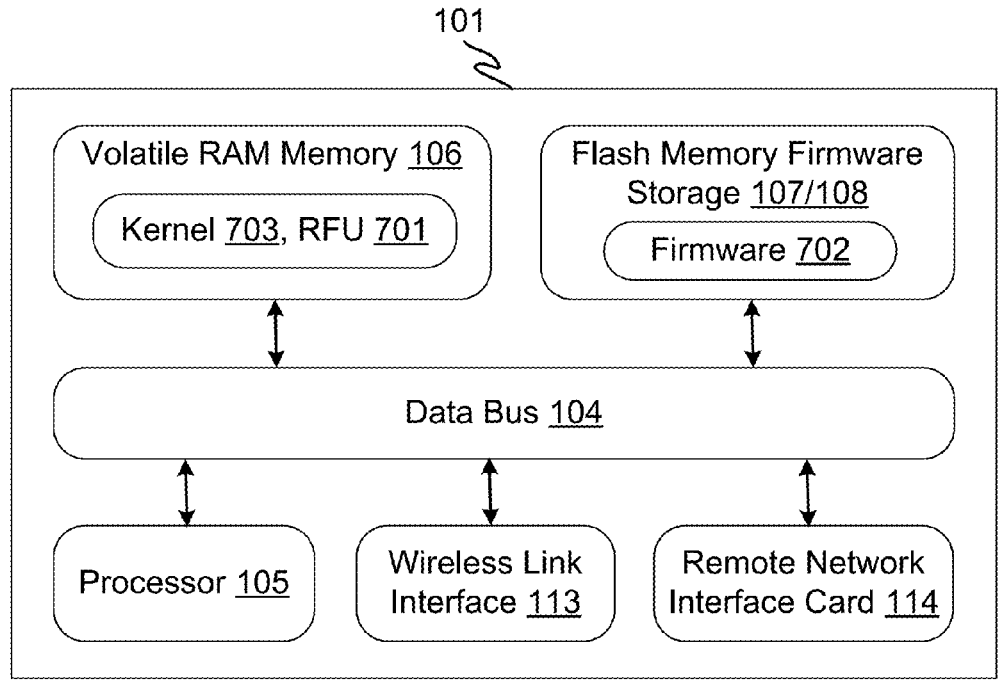
FIGS. 7A and 7B depict alternative schematic diagrams of a wireless router system and device for processing network content, include one wireless router configuration with an Ethernet 10/100 Mbps local area network interface card, and one configuration without that network interface card.
Figure 7B:
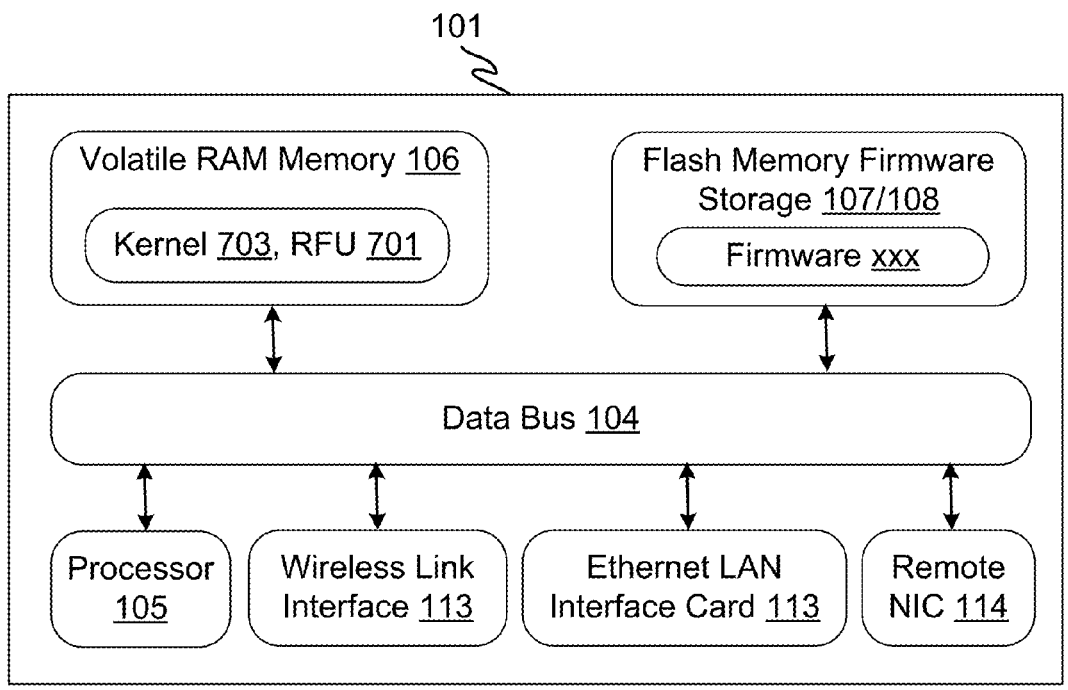
Figure 8:
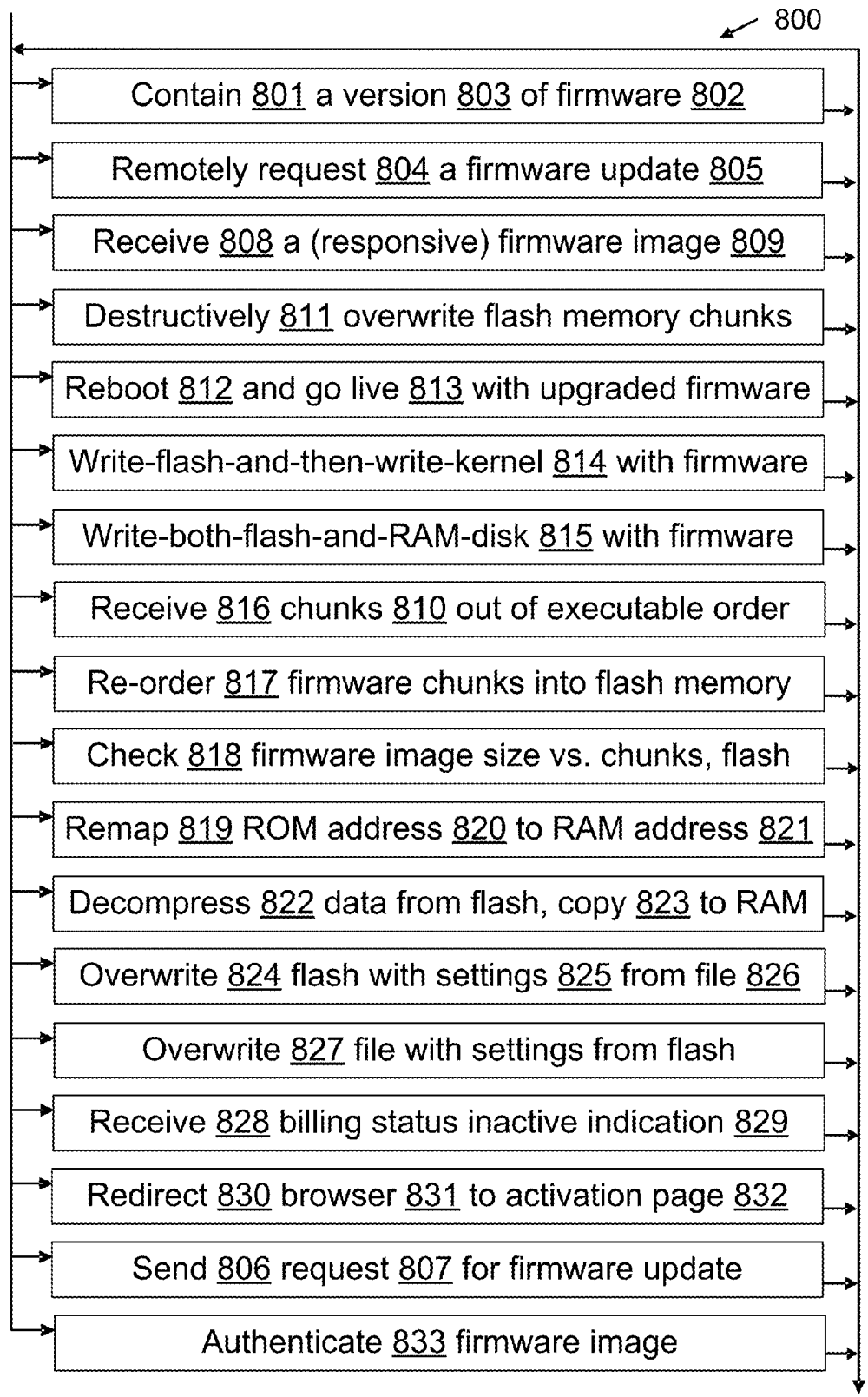
FIG. 8 is a flow chart illustrating steps of some method embodiments for remoter firmware update.

In some embodiments, a Remote Flash Updater (RFU) is a utility capable of writing to flash memory, a type of non-volatile memory storage, with an image file gathered off a HTTP server. With reference to FIGS. 7A, 7B, and 8, for example, in some embodiments the RFU 701 is a utility capable of writing firmware 702 to flash memory 107 or other firmware storage 108. The RFU may be implemented to run with a kernel 703, such as an open source operating system kernel.

In one embodiment, the RFU 701 is a Linux 2.4 kernel based user-land software running on an ARM based chipset. It is written in ANSI C programming language compiled cleanly with an ARM gcc compiler with the —Wall and —O2 compiler flags. RFU 701 development may be guided by familiarity with flash memory code source samples including source code for a flash kernel driver, and a library implementation that interfaces with the flash kernel driver. One RFU 701 uses a C library with flash I/O functionality. One RFU binary name is RFUpdater.

In one embodiment, the Linux 2.4 system implements a ROM to RAM remap 819 for file system access. Upon boot, the boot loader decompresses 822 data held within flash memory and copies 823 it into a RAM based file system. After the RFU 701 updates flash memory 107 or other firmware storage 108 with an image file, the system 101 will reboot 812 in order for the changes to be live. Secure, cross-standard and compact programming methodologies are used.

One Updater 701 method includes the following steps, which are exemplary rather than the sole possible implementation of teaching herein. Begin updater execution. Calculate kernel 703 and ramdisk flash memory offset and size. Initialize POST update variables. Issue an HTTP 1.0 POST request on update.akalink.net port 80/TCP. Read header response, continue if new update is available. Read header response, image file size >100 KB and <3.5 MB. Calculate kernel and ramdisk flash memory offsets from image file. Write 815 image file to 128 KB blocks of RAM (write kernel and ramdisk separately). Re-order 817 RAM blocks in received order. Authenticate 833—if image file checksum is valid, continue. This is a less than 180 second cycle. Perform overlapping steps to re-program flash memory starting with kernel followed by ramdisk (a kernel-first approach 814): Erase next block chunk of flash, write next block chunk to flash from RAM, free up RAM block chunk. Reboot 812 system.

In some embodiments, a purpose of the remote flash updater 701 is to write to flash memory 107 or other firmware storage 108 an image file upon invocation, the image file being gathered remotely from a HTTP site.

During a process of downloading the image file off the HTTP server, some embodiments require the image file to be chunked down in 128 KB memory blocks since the system 101 won't be able to allocate 3.5 MB of memory in a single allocation. This option is dynamic for tuning purposes. Block re-ordering 817 is done afterwards to validate the image checksum.

Some embodiments utilize already existent flash library functions to achieve the result of re-programming flash memory; they don't require re-writing a full flash implementation from scratch.

In some embodiments, the image file contains the kernel image and the ramdisk image embedded as one. Therefore, byte offsets headers during the HTTP session are provided in order for the kernel image and ramdisk image to be written to the proper flash memory 107 or other firmware storage 108 area allocated for their usage.

During the process of receiving 808 the image 809 file off the HTTP server and writing the image file to flash memory, some embodiments perform basic authentication 833 to verify if the image file is valid.

In some embodiments, the maximum size of flash memory an embodiment is utilizing is 4 MB. 256 KB of memory is reserved with another 256 KB memory of free space, therefore only 3.5 MB is allocatable to flash memory.

In some embodiments, the kernel image is written to flash memory starting from 0x10000 to the size of 0x0007FFFF. The ramdisk image is written to flash memory starting from 0x90000 to the size of the image.

In some embodiments, the flash library and flash kernel library header files provide information regarding flash memory offsets, instructions and function. An implementer may study the flash source code provided along with this document in order to write this software. Along with the source code, ethloader.c is software that remotely updates flash memory by passing it a file name, kernel image or ramdisk image, with or without specifying length. It could be a good source of reference to utilize as it can broaden understanding and avoid confusion.

In some embodiments, after the updater 701 is executed, it will initialize all variables regarding kernel and ramdisk memory area begin and end offsets and anything else related to that in order to know where to write what in what area, sizes of blocks, how many blocks to write, etc. It will then initialize a HTTP POST request 804 to be sent to update.akalink.net on port 80 via TCP/IP (of course, other websites will be used by other vendors). The socket timeout is 5 seconds, and 15 seconds for a returned response.

An example of a POST request:
action=update
name=hcube
item=image

An example of a POST response:
X-Update-Length: 2097152<-Length of image
X-Update-Offset: 668402<-Last byte of Kernel Image from 0
X-Update-Cksum: 1808e84cfcbaf71ce1073 cc418ff262a<-cksum checksum
X-Update-Item: image<-Item requested
Image file data here<-Item requested data If the X-Update-Item header value is "image" in such embodiments, the embodiment knows it is dealing with the correct item, and will proceed.

Some embodiments will then verify if this image file is recent by verifying if the header X-Update-Cksum is different than the Cksum cksum located in a file called "cksum" which holds the contents of the image current cksum.

If so, processing proceeds to see if 818 the X-Update-Length header value is less than 3.5 MB (3670016 bytes) and larger than 100 KB (102400 bytes).

If so the embodiment will read and write the image file off the HTTP server to various 128 KB RAM blocks in two different groups one for the kernel image and one for the ramdisk image, separating them based on the X-Update-Offset header value.

Before the Offset starting from 0 is the kernel image, and after the offset is the ramdisk image. The X-Update-Offset header value represents the last byte of the kernel image starting from 0 byte, the rest till the last byte represents the ramdisk image.

Some embodiments will re-order 817 the RAM blocks in first received priority and see if 833 the cksum checksum of the total image corresponds to the value of X-Update-Cksum.

Some embodiments will begin to re-program flash memory, and will proceed to start writing the kernel byte offset range rather than the ramdisk offset range afterwards. Kernel image goes first (a kernel-first approach 814). This process is on a block level not a byte level for performance purposes.

In some embodiments, the procedures will erase the next available 128 KB blocks in flash, will write to flash the next 128 KB available block chunk from RAM, and afterwards will de-allocate the RAM block chunk memory written and proceed in a cycle until the image file has been written.

Once the embodiment has completed writing the image file to flash memory, it will reboot 812 the system in order for the image file changes to go live.

In some embodiments, Online Upgrade Software will destructively 811 upgrade the flash 107 on a chunk by chunk basis unless adequate headroom exists to maintain a redundant flash bank to hold the working software.

In some embodiments, a CubeUpdater is a built-in software component whose purpose is to perform software updates and check for new updates on a daily basis. The CubeUpdater will use 6 am, 12 am, 6 pm as hours during the day to attempt to perform a software update. This is used in case if the internet connectivity is down at 6 am, it will retry at different hours.

When it comes time to perform the software update, it will connect to update.spamcube.com on port 80 and issue a HTTP POST with the following variables: mac=>00:20:ed:25:34:37. Other websites and addresses will, of course, be used in other implementations.

It will return the following answer if there is an error:
0: Invalid client identification
2: No updates available
3: Billing information is inactive If the client billing is not active, the next time the client browses a site, the router redirects 830 the browser to a billing activation page, such as a user profile web page that informs the user of billing status and invites the user to make payment or other arrangements to activate service. In some embodiments, an LED status on the router is also changed to reflect the billing status and notify the client.

In some embodiments, the router upgrade includes software generally, as opposed to firmware alone. The upgrade software can be stored on a disk local to the router, e.g., in compressed or archive format such as tar or gz format. After extracting the software, setting/checking permissions, and applying the upgrade, the router continues (sometimes without rebooting) providing services to the user client.

Some embodiments include a software hierarchy, implemented in a collection of file system directories. In a Linux system or other UNIX-style system, for example, .o object code for the router may be kept in a /boot/modules directory. Configuration files such as .conf and some .txt files, may be kept in a /usr/local/<router>/conf directory, where <router> is a name representing the router code, e.g., "hcube" or "RFU". A sysconfig database configuration file may be kept in a /usr/local/<router>/conf directory, for example. User interface .html files may be kept in a /usr/local/<router>/www/include/tpl/html directory, for example.

A user interface in some embodiments includes pages in a web browser, through which the router receives commands (e.g., check for available updates) and notifies the user of status (e.g., billing inactive, upgrade needed, upgrade available, upgrade installed). Familiar mechanisms may be used in the user interface, e.g., HTML forms and form variables, CGI files, HTML template pages, environment variables, configuration files, and so on. Some embodiments perform a flash update procedure on a WEB_CONFIG_FILE to write the configuration file to flash memory storage.

Some embodiments update a text file containing configuration settings to flash memory via CGI. The CGI file will be executed on a system utilizing flash memory 107 as storage, therefore this functionality is used to keep updated configuration settings in memory after a system reboot. In some embodiments, the flash update functionality is already in place, it is being used to update another file called sysconfig. Some embodiments can use webconfig/flash.c function call kd_updateFlash and setDefault to provide functionality to update our custom configuration file settings to flash memory.

In some embodiments, the configuration file settings will simply be a text file with variables separated by a semicolon pointing to a value separated by a new line. The configuration file settings is "sample.cnf" modifiable by a define statement. Comments should be ignored.

For example, "SysIPAddress: 192.168.200.1\n" would be a configuration line.

Some embodiments build on familiar mechanisms. For some embodiments, one of skill may be interested in source provided under names such as webserver, webconfig, sysconfig.

By way of example, and not limitation, one embodiment includes: at least 2 10/100 Mbps Ethernet ports, an ARM based processor of at least 10 MHz, at least 10 MB of memory which can include SDRAM, SRAM, FLASH, and also ROM, a reset button, a power supply, LEDs, and a printed circuit board or other motherboard to which the other components are soldered/attached/connected. The components are housed in a plastic case. But with regard to hardware, one of skill will understand that methods described herein can be used for a wide variety of hardware combinations, including variations in memory capacity, processor architecture and speed, interface capabilities, and other characteristics of computing/networking hardware.

It is to be understood that both the foregoing and the following descriptions are exemplary and explanatory only and are not intended to limit the claimed invention or application thereof in any manner whatsoever.

Automatic Remote (Networked) Updating Capability

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

In some embodiments, a methodology provides an integrated plug and play solution for home networks. An appliance can be used for processing of web and email traffic and can be deployed as a stand-alone appliance. In one implementation, the appliance utilizes a remote service accessed via a network. The system executes various procedures to handle the network traffic. In one embodiment, the system is provided with an automatic remote updating capability, wherein the software and data used by the system can be updated remotely via a network.

In some embodiments, a method includes connecting a network hardware appliance to an external network within a home network configuration; including a central processing unit (CPU) on the network hardware appliance; providing a memory for storing a set of computer-readable instructions executed by the central processing unit (CPU) on the network hardware appliance; connecting the network hardware appliance to one or more user computers; installing the network hardware appliance between the external network and the user's computer; passing all network traffic between the user's computer and the external network through the network hardware appliance; generating a request to retrieve firmware; and receiving firmware. Some embodiments include authenticating with a remote system using authentication information. Some include reading from the world wide web using HTTP protocol.

Some embodiments relate to an appliance for processing email and web traffic. In some embodiments, for example, a network hardware appliance is provided for use with a personal computer of a user, the personal computer being connected to a home network of the user. The network hardware appliance includes a central processing unit (CPU); a first network interface connected to the personal computer of the user; a second network interface connected to an external network; and a memory storing a set of computer-readable instructions. When executed by the CPU the instructions cause the CPU to perform automatic remote firmware updates as described herein.

In some embodiments, the personal computer of the user is connected to an external network. The network hardware appliance is connected to the home network and is positioned between the personal computer of the user and the internet.

In some embodiments, a user request for a web resource is intercepted. The system requests from a target web server the source code for the resource and receives the source code of the requested source from the target web server. In some embodiments, an apparatus intercepts content of a web resource requested by a user. The requested web resource being located on a target web server. The apparatus includes a central processing unit (CPU), a first network interface coupled to the computer of the user, a second network interface coupled to the external network and a memory storing a set of computer-readable instructions. The CPU operating under the direction of the stored instructions intercepts a user request for the web resource, requests from the target web server the source code for the resource, and receives the source code of the requested source from the target web server.

An embodiment of the methodology provides an integrated plug and play solution. The appliance can be used for processing of web and email traffic and can be deployed as a stand-alone appliance. In an embodiment, the system employs network level analysis and translation and executes various procedures to handle the network traffic. In one embodiment, the appliance is provided with an automatic remote updating capability, wherein the software and data used by the appliance can be updated remotely via a network.

FIG. 1 depicts a schematic diagram 100 of an exemplary embodiment of a network appliance 101 for processing email communications as well as other network content. With reference to FIG. 1, the appliance may include a data bus 104 or other communication mechanism for communicating information across and among various parts of the appliance 101, and a processor (CPU) 105 coupled with bus 104 for processing information and performing other computational and control tasks. In one embodiment the processor 105 is an ARM processor with clock speed of at least 10 MHz. Appliance 101 may also include a volatile storage 106, such as a random access memory (RAM) or other dynamic storage device, coupled to bus 104 for storing various information as well as instructions to be executed by processor 105. The volatile storage 106 also may be used for storing temporary variables or other intermediate information during execution of instructions by processor 105. In one embodiment, the size of the memory unit 106 is at least 10 MB. The appliance 101 may further include a read only memory (ROM or EPROM) 107 or other static storage device coupled to bus 104 for storing static information and instructions for processor 105, such as basic input-output system (BIOS), as well as various system configuration parameters. A persistent storage device 108, such as a magnetic disk, optical disk, or solid-state flash memory device is provided and coupled to bus 104 for storing information and instructions.

The embodiment of the appliance 101 shown in FIG. 1 also includes at least two communication interfaces, such as network interfaces 113 and 114 coupled to the data bus 104. Communication interfaces 113 and 114 provide a two-way data communication coupling to a network link 114 that is connected to the network 115. For example, communication interfaces 113 and 114 may be 10/100 Mbps local area network interface cards (LAN NIC) to provide a data communication connection to a compatible LAN. Wireless links, such as well-known 802.11a, 802.11b, 802.11g and Bluetooth may also be used for network implementation. In any such implementation, communication interfaces 113 and 114 send and receive electrical, electromagnetic or optical signals that carry digital data streams representing various types of information.

Network link 114 typically provides data communication through one or more networks to other network resources. For example, network link 114 may provide a connection through network 115 to a host computer 120, or to other network resources (not shown). Thus, the appliance 101 can access network resources located anywhere on the Internet 115, such as a remote network storage or web servers. On the other hand, the appliance 101 may also be accessed by user computer 121 located anywhere on the corresponding local area network.

Local network (not shown) and the Internet 115 both use electrical, electromagnetic or optical signals that carry digital data streams. The signals sent through the various networks and the signals on network links 113 and 114, which carry the digital data to and from appliance 101, are exemplary forms of carrier waves transporting the information.

However, carrier waves per se are not claimed. Whenever reference is made herein to data or instructions, it is understood that these items configure a computer-readable memory (RAM, ROM, flash, etc.), thereby transforming it to a particular article, as opposed to simply existing on paper, in a person's mind, or as a carrier wave or other transitory signal on a wire, for example. Unless expressly stated otherwise in a claim and permitted by applicable law at the relevant time, a claim does not cover a signal per se. A memory or other computer-readable storage medium is presumed to be non-transitory unless expressly stated otherwise.

The appliance 101 can send messages and receive data, including program code, through the variety of network(s) including any local area network as well as the Internet 115 by means of network links 114 and 113. For example, when the system 101 acts as a network server, it might transmit a requested code or data for an application program running on user's computer 121 client(s) and/or the host 120 through any local area network (not shown) as well as the Internet 115. Similarly, it may receive code or data from other network entities. Likewise, in some embodiments the system 101 includes functionality of a network hub, router, modem, or other network device which has a position in the network configuration adjacent to an illustrated Spam Cube 101 position.

In particular, some embodiments include router functionality. Router functionality in general is familiar. As noted, for example, in U.S. Pat. No. 6,321,267 to Donaldson, in some cases a packet-filtering router routes packets from the Internet to an SMTP proxy server via a LAN. The router operates at the network layer of the protocol reference model using the Internet Protocol version 4 (IPv4). However, with appropriate changes to the socket programming interface, router functionality also operates with other network layer protocols such as Internet Protocol version 6 (IPv6) or Novell Netware. As noted in US Patent Application Publication No. 2002/0007453 by Nemovicher, some routers switch communication traffic between a communication network and a LAN under the direction and control of a load balancer and fire wall. As noted in US Patent Application Publication No. 2006/0053293 by Zager et al., in some cases IP addresses are dynamically assigned to most users by DHCP servers at the ISP or a router at the edge of the LAN on which the sender computer resides. As noted in US Patent Application Publication No. 2006/0068755 by Shraim et al., a computer and/or any other appropriate system component may use resources such as publicly-available domain name server (DNS) data, routing data and/or the like, to investigate a server suspected of conducting fraudulent activities. As another example, the routing information in the message header may be analyzed to determine whether the message originated from and/or was routed through a suspect domain, again enhancing the likelihood that the message is a phish.

With continued attention to FIG. 1, the received code may be executed by processor 105 as it is received, and/or stored in persistent or volatile storage devices 108 and 106, respectively, or other non-volatile storage for later execution. In this manner, the appliance 101 may obtain application code updates from remote network resources.

The appliance 101 may also use the network interface 114 to receive various code and data updates, which it may use in its operation. For example, such data updates may include latest virus definition files. For this purpose, the appliance may perform periodic checks to determine whether such updates are available. The appliance 101 may also user network interfaces 114 to issue requests to remote network resources, such as remote virus scanning services and to receive the appropriate responses. Finally, the user may connect to the appliance through, for example, network interface 113 in order to perform necessary configuration of the appliance.

In one embodiment, one or both of the network interfaces 113 and 114 may be a wireless network interface operating in accordance with a wireless networking protocol, such as Bluetooth, 802.11a, 802.11b and/or 802.11g. In another embodiment both interfaces 113 and 114 are conventional wire-based network interfaces.

Figure 2A:
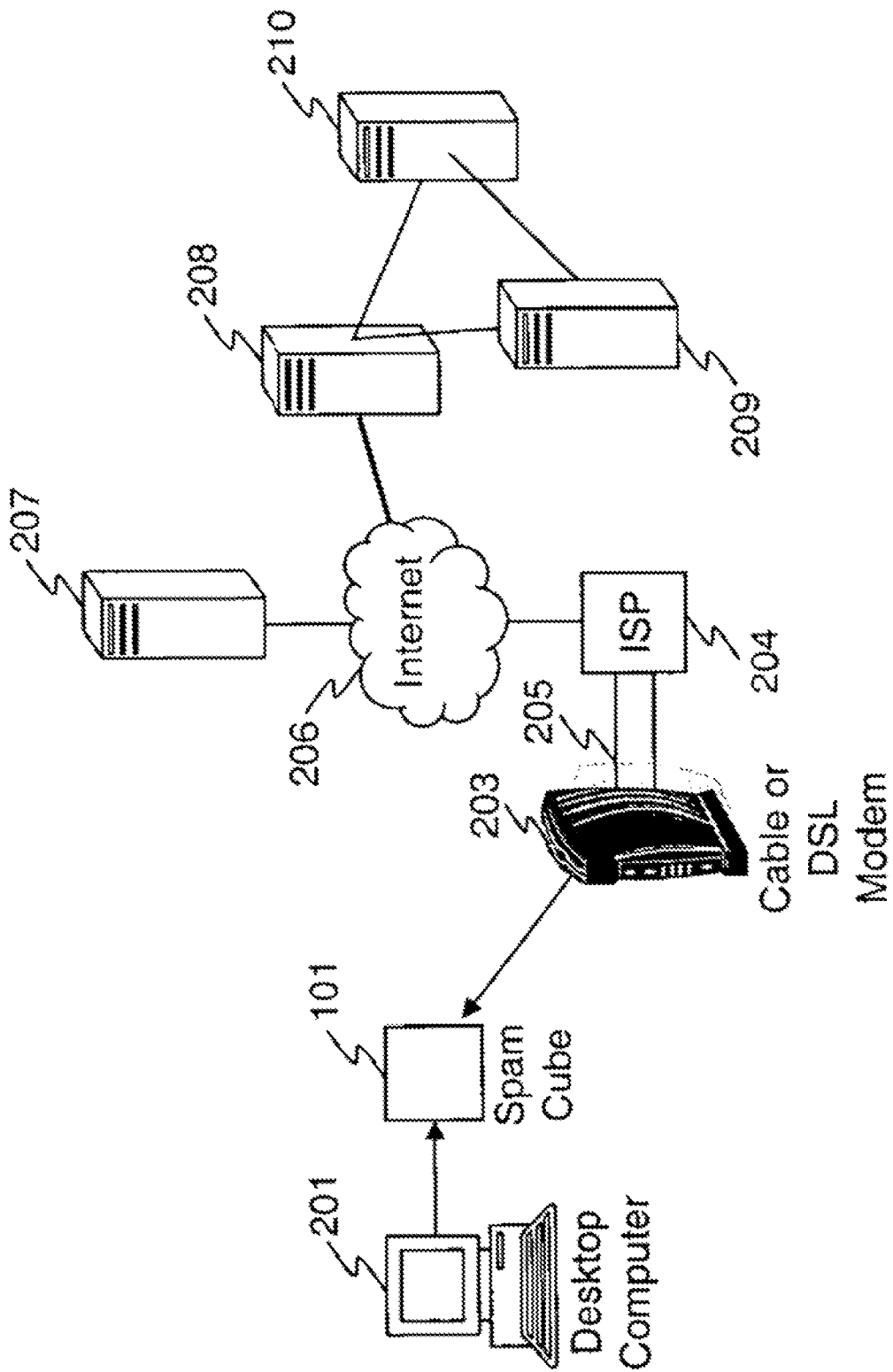
FIG. 2A illustrates an exemplary configuration to protect a single desktop computer.

FIG. 2A illustrates an exemplary home network configuration, wherein the appliance 101 is configured to protect a single desktop computer 201. In this exemplary configuration, the appliance 101 is installed between the cable/DSL modem and the user's desktop computer, such that all network traffic between the user's computer 201 and the outside network 206 passes through the appliance. To this end, the user's computer 201 is connected to one of the aforementioned two network interfaces 113 and 114, while the other interface is coupled with the cable/DSL modem 203. The modem 203, in turn is connected via connection 205 with ISP 204, which enables the user's computer to access the internet 206 and remote servers such as servers 207, 208, 209, 210. In an alternative embodiment, the functionality of the illustrated Spam Cube 101 and of the adjacent cable or DSL modem 203 is combined into a single system 101.

Figure 2B:
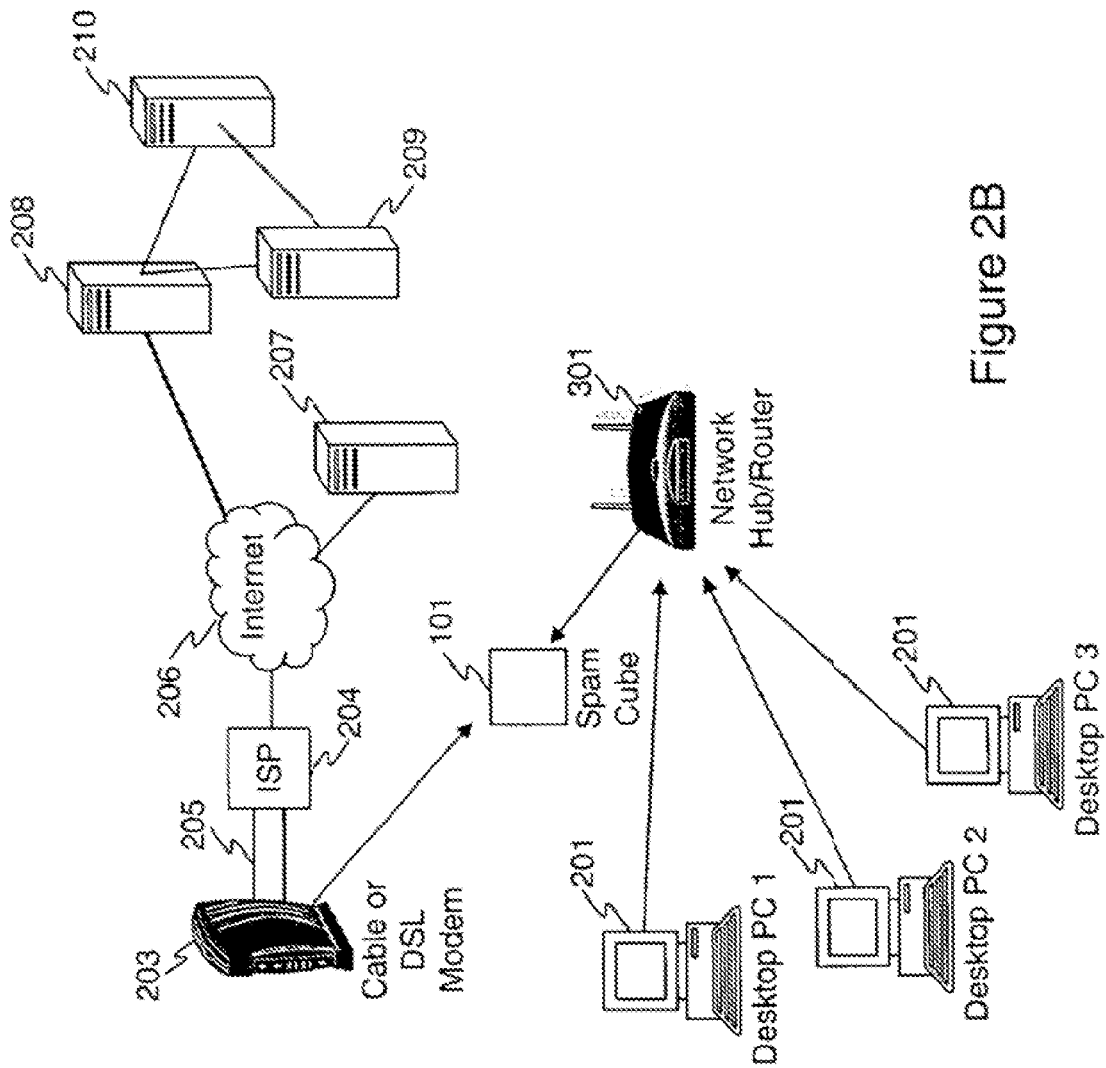
FIG. 2B illustrates an exemplary configuration to protect a local area network (LAN), which includes multiple desktop computers.

FIG. 2B illustrates an exemplary configuration of home network 300, which includes the appliance 101 configured in a manner designed to protect a local area network (LAN), which includes multiple desktop computers 201. In this configuration, the appliance 101 is installed between the cable/DSL modem 203 and the network hub/router 301, which provides network connectivity to the desktop computers 201.

In alternative embodiments, the functionality and components of the illustrated Spam Cube 101 is combined into a single appliance or system 101 with the functionality and components of the adjacent cable or DSL modem 203, or with the functionality and components of the adjacent Network Hub/Router 301, or with the functionality and components of both the modem 203 and the router 301. In such configurations, the appliance 101 can filter all network traffic reaching the computers 201.

The network hub 301 may be wireless network-enabled. In an alternative embodiment, the network hub 301 may be integrated with the appliance 101. The integrated hub may also be either wireless or wired.

The other elements of the networking configuration shown in FIG. 2B, including cable/DSL modem 203, connection 205, and ISP 204, are generally equivalent to the corresponding elements of FIG. 2A, described hereinabove.

Figure 3:
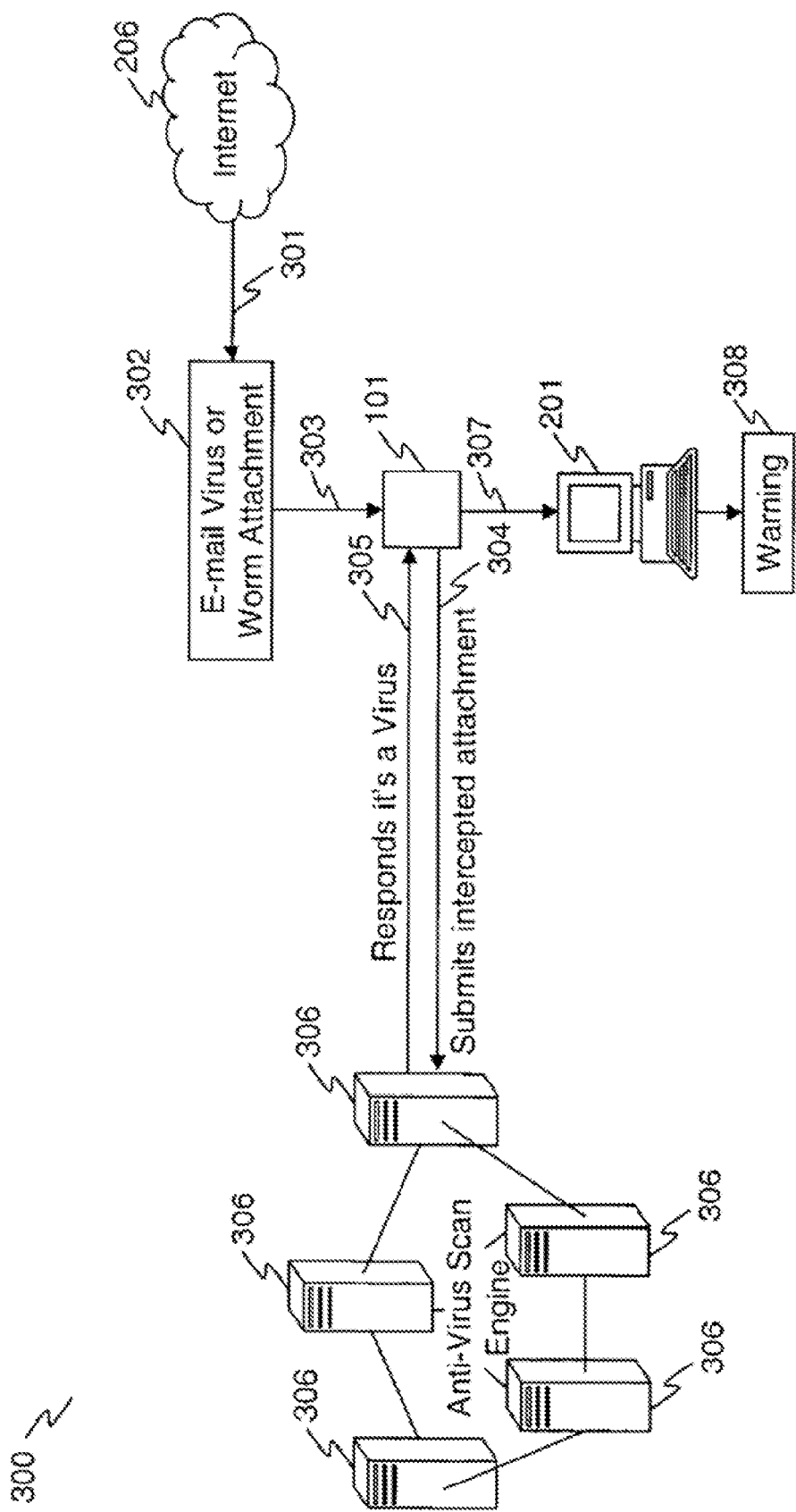
FIG. 3 illustrates an exemplary operating sequence of a system and device configured to process email traffic.

FIG. 3 illustrates an exemplary operating sequence of a network appliance configured to process email traffic. In accordance with the illustrated sequence, email message 302 is sent by an entity located on the external network (e.g. Internet) 206 to the user's computer 201. The message 302 may contain one or more attachments, which may include certain malware, such as viruses, worms or other threats. In order to facilitate protection of the user's personal computer from the threats contained in the email 302, the appliance 101, is arranged to intercept the email message 302. Upon the interception of the message 302 by the appliance 101, the appliance 101 performs an initial inspection of the received email message and its attachment(s) and, if necessary, submits a service request 304 to the remote antivirus scanning engine 306. The aforementioned service request may direct the external virus scanning service to perform a virus check of any attachments to the email message 302. In order to enable the requested scanning, the appliance 101 may include the corresponding attachments with the request 304. In one embodiment, the appliance 101 requests the anti-virus scanning of only specific attachment types. For example, during the initial inspection, the appliance 101 may determine whether the attached file is an executable and request remote scanning of the attachment based on the results of this determination.

After receiving the request 304 from the appliance 101, together with the relevant attachment email files, the remote scanning system 306 performs the necessary processing of the email attachments and determines the presence of any threats therein in accordance with well-known scanning algorithms. The scanning system may utilize a plurality of alternative scanning algorithms. The exact algorithm used by the system may be selected by the user of the appliance 101 during the configuration process. The user's selection may be stored in the storage devices 106, 107 or 108 of the appliance 101. Existing scanning products which may be used by the scanning system 306 include, without limitation, Norton Antivirus and McAfee Security software. The use of the remote scanning service 306 enables the system to perform scanning operations in an on-demand manner without providing the appliance 101 with the processing power required to perform the scanning operation. In addition, the scanning software executing on servers 306 may be easily and conveniently updated. The aforementioned two features of the system configuration enable the appliance 101 to be implemented using inexpensive hardware.

After the completion of the scanning process, the external scanning engine 306 responds to the appliance 101 with response 305 containing information on any detected threats. For example, the response 305 may indicate that one or more of the attachments to the email contain viruses. Upon receipt of the response, the appliance 101 neutralizes the detected threat, by, for example, removing the infected attachment, and re-writes the received email message 302 to include appropriate warning to the user. The aforesaid warning may be placed either in the subject line or in the body of the message. The re-written email containing the warning 308 is then forwarded by the appliance 101 to the user's computer 201. Finally, the appliance 101 performs the update of its statistics information.

Figure 4:
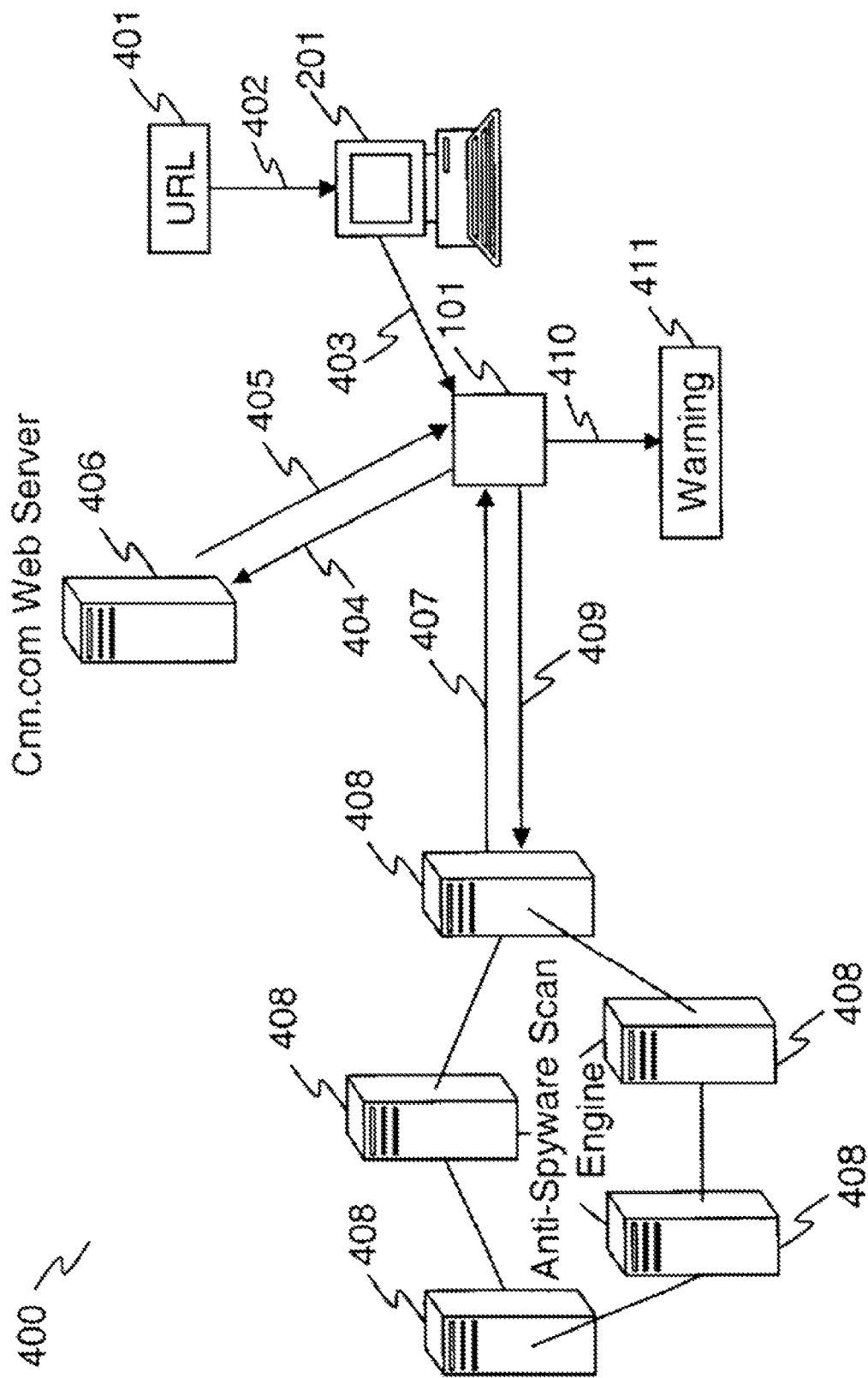
FIG. 4 illustrates an exemplary operating sequence of a system and device configured to process various web content viewed by a user using the user's computer.

FIG. 4 illustrates an exemplary operating sequence 400 of the network appliance configured to process various web content viewed by a user using user's computer. The depicted process is initiated when a user requests a web resource by inputting at 402 URL 401 into a web browser window on user's computer 201. Upon the receipt of the URL information 401, the browser sends HTTP request 403 requesting the target web service (in the example shown in FIG. 4, the target website is) the website of CNN news service) to provide the resource specified by the received URL. The request 403 is intercepted by the appliance 101, which contacts the target web server 406 on behalf of the user and sends a request 404 for the source code of the web resource specified by the user. In response to the received request, the target server 406 sends a reply message 405, accompanied with the full source code of the requested resource. The appliance 101 receives the code furnished by the web server 406 and initiates a scan of the received source code for any possible threats, including, for example, any spyware.

During the scan process, the appliance 101 may use a remote scan engine 408 to achieve most comprehensive threat detection. To this end, the appliance 101 may send a request 409 to the remote network of scan engines 408 containing the entire source code of the web resource, or any portion thereof. The outside scan engines 408 examine the content of the received source code and send reply 407 to the appliance, indicating whether any potential threats were detected. Upon the receipt of the reply 407, the appliance 101 sends at 410 a warning message 411 to be displayed in the user's browser window, warning the user of the presence of any potential threats within the requested web resource. In one embodiment, after the appropriate warning is displayed to the user, the user is provided with an option to either avoid viewing potentially harmful web resource or to proceed with the viewing despite the shown warning.

Figure 5A:
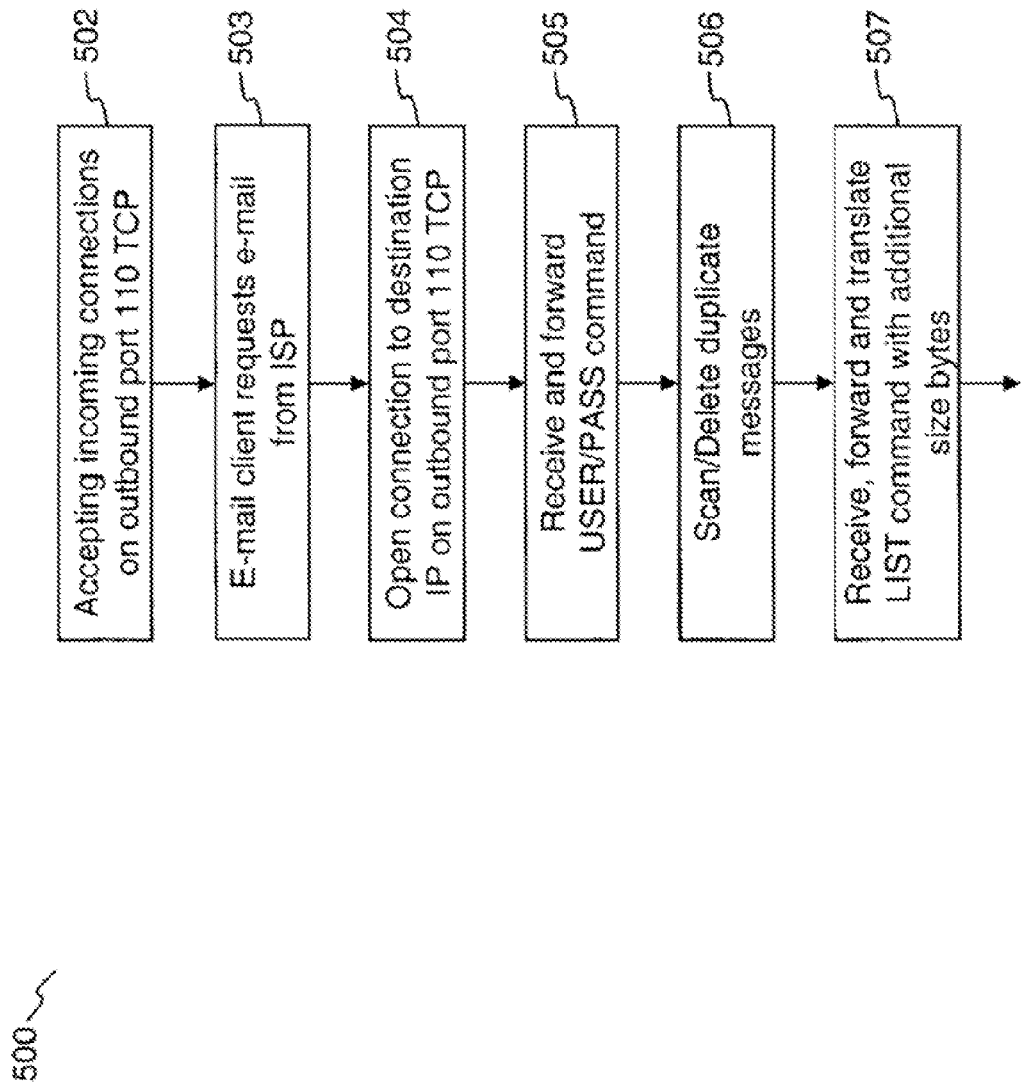
FIGS. 5A, 5B, 6A and 6B provide more detailed illustration of an internal operating sequence of a system and device.

FIGS. 5A, 5B, 6A and 6B provide more detailed illustration of the internal operating sequence of an embodiment of the appliance. Specifically, FIG. 5A depicts the first phase 500 of that exemplary operating sequence. The shown operating sequence is executed by the CPU 105 shown in FIG. 1. In order to enable the appliance to execute the described procedures, the appliance may be provided with an operating system, which may be pre-loaded into one or more of the storage devices 106, 107 and 108 of FIG. 1. Exemplary operating systems which may be used to control appliance 101 include Linux, UNIX (example: BSD), or RTOS (example: VxWorks).

The process illustrated in FIG. 5A is automatically initiated when, at step 502, the appliance 101 accepts a connection from user's computer 201 on the outbound port 110, corresponding to TCP/IP protocol, well known to persons of skill in the art. Through the established connection, at step 503, the appliance 101 intercepts a request generated by user's email client software to retrieve messages corresponding to user's email account from the internet service provider (ISP). At step 504, the appliance opens a connection to the destination IP address corresponding to the email service subsystem of the ISP. At step 505, the system receives authenticating information, such as username and password, corresponding to user's email account with the ISP. The system uses the received authentication information to establish a session with the remote email service and, at step 506, sends to this service a command to scan the user's mailbox for duplicate messages and, when appropriate, to delete them. At step 507, the system receives the "LIST" command from the user's email client and forwards it to the email service system. The aforesaid list command request the email service to provide the listing of all emails in the user's email account.

Figure 5B:
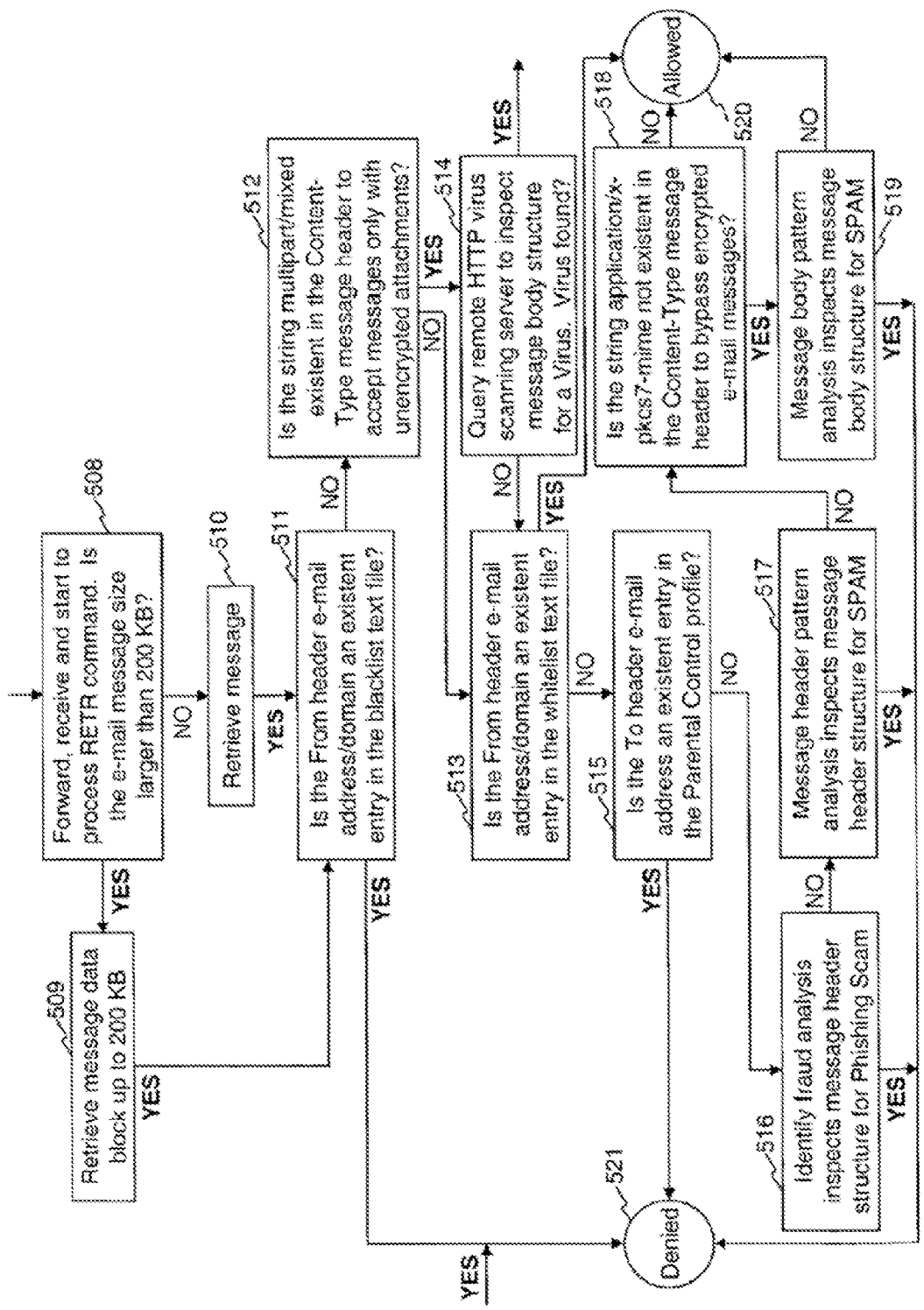

The continuation of the first phase 500 of the process shown in FIG. 5A is illustrated in FIG. 5B. At step 508, the appliance receives from the user's email client the "RETR" command, which requests the remote email subsystem to retrieve one or more email messages in the user's email account. Upon the receipt of this command from the email client, the appliance 101 forwards it to the email server, which, in response, begins a message retrieval process. Prior to retrieving a specific message, the appliance 101 first performs a check of the message size. If the size of the message is less than a predetermined threshold value, for example, 200 KB, the system retrieves the entire message, see step 510. On the other hand, if the size of the message exceeds the aforesaid threshold, only a block of the message is retrieved, see step 509. In one embodiment of the system, the size of the retrieved block is 200 KB. However, other block sizes may be used instead.

Upon the retrieval of the message, the system first checks if the sender of the message identified in the "From" field thereof matches an existing entry in the blacklist table. This table lists all senders, the email correspondence from which should be blocked. If the match in the blacklist table is found, the corresponding email message is blocked at step 521. At step 512, the appliance checks whether the content of the message, as described by the "Content-Type" field of the message header, may include encrypted attachments. If the message contains only unencrypted attachments, the operation proceeds to step 514, whereupon the system requests the remote HTTP virus scanning server to perform the scanning of the message body for viruses. If the virus is found, the system blocks the message at step 521. If, no virus is found or if the message may contain encrypted attachments, the operation of the system proceeds to step 513, whereupon the sender of the message, which is identified in the corresponding "From" record, is compared with entries in the whitelist table. This table contains a list of sender email addresses from which email correspondence should be allowed without further inspection. If the sender address matches one of the aforesaid whitelist entries, the email message is allowed at step 520.

On the other hand, if the message sender email address does not match any entries in the whitelist, the system checks the recipient of the email message identified in the "To" field of the message header against entries in the parental control profile. This profile includes email addresses of recipients, which should not receive email messages. If the match is found, the email message is again blocked at step 521. If no matching entries in the parental control profile exist, the system proceeds with step 516, whereupon the identity fraud analysis algorithm inspects the header of the email message for possible phishing scam. If such scam is detected, the message is again blocked at step 521.

Upon passing of the phishing scam inspection, the message header pattern is analyzed at step 517 for SPAM content. Again, if SPAM is detected, the message is blocked at step 521. If SPAM is not detected in the header, at step 518, the system checks whether the message header indicates presence of encrypted email message. The encrypted content is indicated, for example, by presence of "Content-Type: application/x-pkcs7-mime" record in the header of the email. If the content is not encrypted, the system inspects the body of the message for SPAM content at step 519. If the SPAM is not detected or if the email body is encrypted, the system accepts the email at step 520.

Figure 6A:
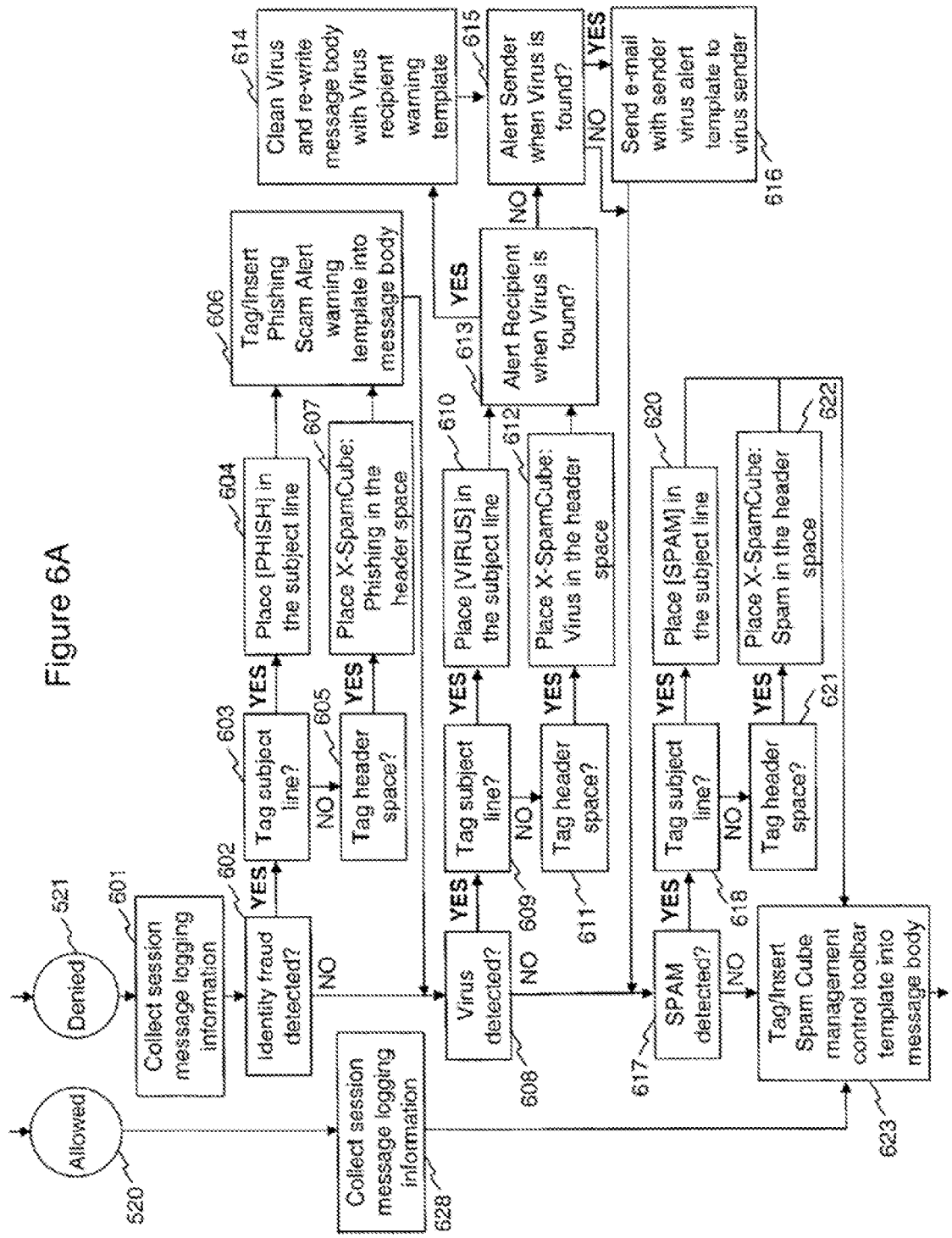

After the email is rejected at step 521 or accepted at step 520, the system performs certain logging and user notification operations illustrated in FIG. 6A. Specifically, is the email is allowed or denied, the system collects and stores the session logging information at steps 628 and 601, respectively. In case of a denial, the appliance at step 602 verifies whether identity fraud was detected in the email content. If this was the case, the email is tagged by placing an appropriate message, such as "[PHISH]" either in the subject line (step 603) or, alternatively, in the header of the email message (step 607), depending on the configuration parameters specified by the user. The system may further insert phishing scam alert into the body of the message at step 606.

The system then proceeds with the determination of whether a virus was detected in the email, see step 608. If the virus was found, the appliance again performs tagging of the email either in the subject line or in the header, depending on the user's configuration, at steps 609-610 and 611-612, respectively. If the user's parameters call for recipient notification of virus-containing emails, the system disables the virus and re-writes the message body inserting an appropriate virus warning (steps 613 and 614). If the configuration requires sender notification, the appliance generates an email message to the sender of the virus-containing email, which includes a message alerting the sender of the email message of the virus (step 616).

If SPAM was detected in the email message, the email is likewise tagged either in the subject or the header, at steps 618, 620 and 621-622, respectively. Finally, at step 623, the system inserts a management control toolbar into the message body.

Figure 6B:
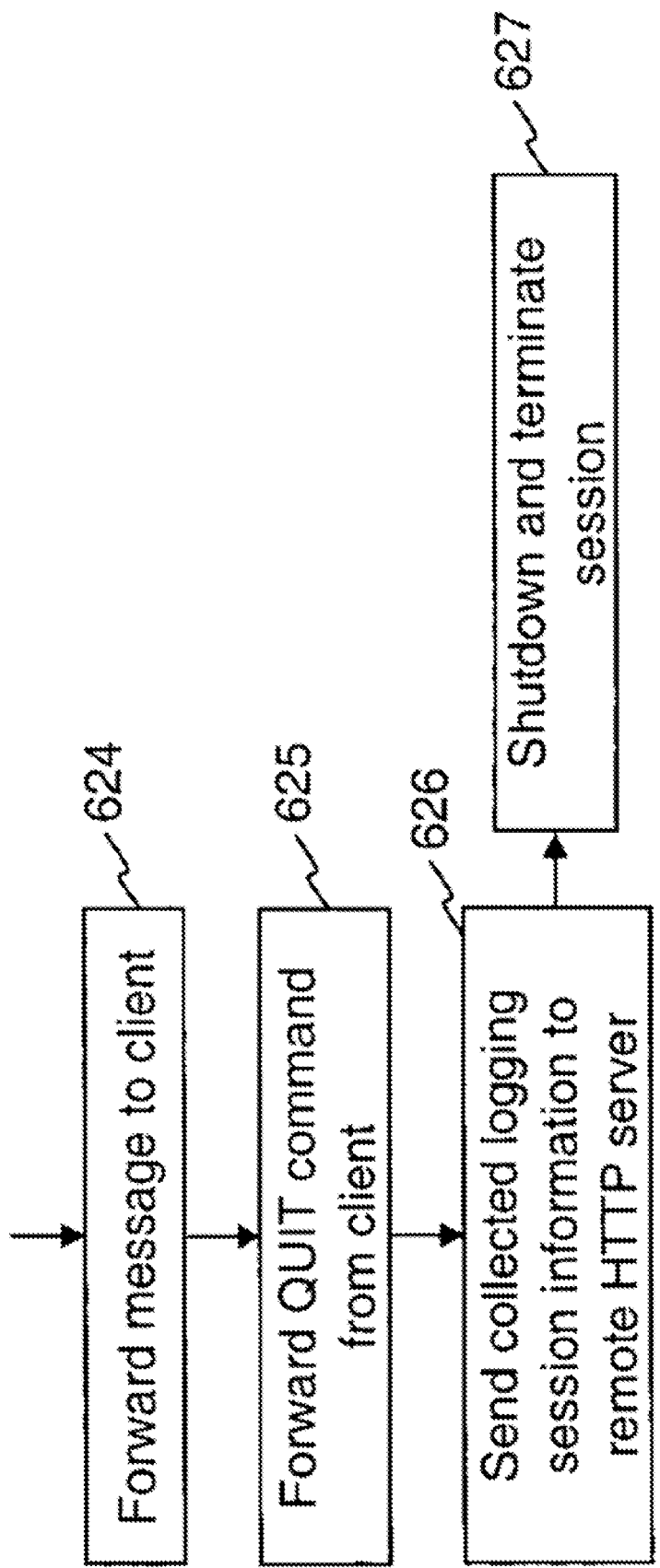

The continuation of the described operating process is illustrated in FIG. 6B. With reference to this figure, the tagged email with the inserted management toolbar is forwarded to the client at step 624. The client terminates the session at step 615 with the QUIT command, which the system forwards to the remote email server. Finally, at step 626, the system sends the collected logging information to a remote HTTP server for storage. The shutdown and session termination is performed at step 627. The system logs detailed information on the accepted and rejected messages, as well as the detected threats. Upon the request by the user, the logged information may be displayed in a text or graphical form.

It should be noted that the present invention is not limited to any specific email or web communication protocols. The appliance may be utilized in connection with any known communication protocols, including, without limitation, POP3, SMTP or HTTP.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, ASP.NET, Java, Ruby, AJAX, Rails etc.

Moreover, other implementations of the invention will be apparent to those skilled in the art from consideration of the specification and practice of the invention disclosed herein. Various aspects and/or components of the described embodiments may be used singly or in any combination in the computerized content filtering system. It is intended that the specification and examples be considered as exemplary only, with a true scope and spirit of the invention being indicated by the following claims.

Methods

FIG. 8 illustrates some method embodiments, in a flowchart 800. In a given embodiment zero or more illustrated steps of a method may be repeated. Steps in an embodiment may also be done in a different order than the top-to-bottom order that is laid out in FIG. 8. Steps may be performed serially, in a partially overlapping manner, or fully in parallel. The order in which a flowchart is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flows, provided that the method performed is operable and conforms to at least one claim. Steps described as being performed by a user may also be performed by another person, or by a machine, on behalf of a user. Another person who performs steps on behalf of a user need not have a particular user in mind.

Some embodiments provide a method for upgrading a wireless router. Some include the step of containing 801a firmware 802 version 803, namely, a flash memory in the wireless router 101 containing a first version of router firmware, with the router firmware including instructions to be executed by a processor 105 of the wireless router, and the router firmware also including data.

Some methods include remotely requesting 804 a firmware update 805, namely, the wireless router sending 806 a request 807 for a firmware update, with the request being sent from the wireless router over a network 115 connection toward a server 207.

Some methods include receiving 808 a responsive firmware image 809, namely, the wireless router receiving over the network connection a response to the request for a firmware update, with the response including at least a firmware image for a second version of router firmware which differs from the first version of router firmware by reason of containing at least one firmware change, a firmware change being a difference in firmware data and/or a difference in firmware instructions. The firmware image includes a plurality of chunks 810, each chunk having a size which is no greater than a predetermined chunk size.

Some methods include destructively overwriting 811 flash memory chunks, namely, the wireless router destructively overwriting the first version of router firmware 802 in the flash memory with the second version of router firmware 802. In some, the destructive overwriting proceeds in a chunk-wise manner such that prior to being overwritten by all of the chunks the flash memory contains neither a complete copy of the first version nor a complete copy of the second version of the router firmware. In some embodiments, the wireless router 101 is configured to run whatever version of router firmware is in the router's flash memory after the router system 101 is rebooted 812.

Some methods include going live 813 with upgraded firmware 802, by reason of the wireless router rebooting 812 and thereby making the firmware change(s) go live.

In some embodiments, a wireless router upgrading method includes writing 814 the flash memory and then writing 814 a kernel 703 memory. That is, the wireless router destructively overwrites the first version of router firmware in the flash memory with the second version of router firmware, and then writes a copy of content of the second version of router firmware to a kernel memory in a volatile RAM memory 106 in the wireless router 101 before going live 813 with the upgraded firmware. This is a kernel-first approach described above.

In some embodiments, a wireless router upgrading method includes writing both 815 flash memory and a volatile RAM disk. That is, the wireless router destructively overwrites the first version of router firmware in the flash memory with the second version of router firmware, and also writes a copy of content of the second version of router firmware to a RAM disk in a volatile RAM memory 106 of the router 101.

In some embodiments, the firmware image chunks 810 have at least one predetermined executable order, namely, an order in which the chunks are arranged in an executable copy of the firmware image. Some router upgrading methods include receiving 808, 816 firmware chunks 810 in a volatile RAM memory in the wireless router in an order which differs from the executable order, and re-ordering 817 the chunks. For example, in some methods the step of destructively overwriting 811 flash memory chunks also arranges 817 chunks in the flash memory in the executable order.

In some embodiments, the firmware image 702 has a size and the flash memory has a storage capacity, and the method includes the wireless router checking 818 to see whether the size of the firmware image is less than a predetermined maximum firmware image size. For example, the predetermined maximum firmware image size can be at least a specified number (e.g., one, two, four, eight) of chunk sizes smaller than the flash memory storage capacity.

In some embodiments, the wireless router remaps 819 a ROM memory address 820 in the router to a RAM memory address 821 in the router. This may be done, for example, to pass control to code at the remapped address. In some methods, the wireless router decompresses 822 data held within the flash memory in the router and copies 823 the data to a RAM-based file system in the router. For example, the router may decompress and copy a firmware image, an operating system kernel, email filtering code, anti-virus definitions, and/or other data.

In some embodiments, the router uses flash memory (in addition to or in place of a hard disk or remote store, for instance) to preserve user configuration through a reboot. Before going live with upgraded firmware, the wireless router overwrites 824 at least a portion of the flash memory with user-definable configuration settings 825 from a text file 826. The settings may be copied, for example, into one or more flash chunks that are not occupied by the firmware image code. After going live with upgraded firmware, the wireless router overwrites 827 the text file with the configuration settings from the flash memory.

In some embodiments, the response received 828 includes an indication 829 that a user's billing status is inactive, and the method redirects 830 a web browser 831 to a billing activation page 832.

In some embodiments, the firmware image chunks 810 have at least one predetermined executable order, the step of receiving a responsive firmware image receives 816 the chunks in the wireless router in an order which differs from the executable order, and the method re-orders 817 the chunks such that the step of destructively overwriting flash memory chunks arranges chunks in the flash memory in the executable order, and the method also writes 815 a copy of the chunks to a kernel memory in the wireless router.

In some embodiments, the router authenticates 833 the firmware image, e.g., by using a server certificate, image checksum, decryption, and/or other familiar authentication tool or technique.

CONCLUSION

Although particular embodiments are expressly illustrated and described herein as methods or as devices, it will be appreciated that discussion of one type of embodiment also generally extends to other embodiment types. For instance, the descriptions of methods in connection with FIG. 8 also help describe the operation of devices/systems like those discussed in connection with FIGS. 1, 2A, 2B, 3, 4, 7A, and 7B. It does not follow that limitations from one embodiment are necessarily read into another.

Not every item shown in the Figures or discussed in the text need be present in every embodiment. Although some possibilities are illustrated here in text and drawings by specific examples, embodiments may depart from these examples. For instance, specific features of an example may be omitted, renamed, grouped differently, repeated, or be a mix of features appearing in two or more of the examples. Thus, email filtering is omitted from some embodiments of appliance 101. Functionality shown at one location may also be provided at a different location in some embodiments. Thus, some appliances 101 have a mix of wireless hub functionality as well as remote update functionality.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for upgrading a wireless router, comprising the steps of:
   (a) containing a firmware version, namely, a flash memory in the wireless router containing a first version of router firmware, the router firmware including instructions to be executed by a processor of the wireless router, the router firmware also including data;
   (b) remotely requesting a firmware update, namely, the wireless router sending a request for a firmware update, the request being sent from the wireless router over a network connection toward a server;
   (c) receiving a responsive firmware image, namely, the wireless router receiving over the network connection a response to the request for a firmware update, the response including at least a firmware image for a second version of router firmware which differs from the first version of router firmware by reason of containing at least one firmware change, a firmware change being a difference in firmware data and/or a difference in firmware instructions, the firmware image including a plurality of chunks, each chunk having a size which is no greater than a predetermined chunk size and is less than one-eight the flash memory storage capacity;

(d) destructively overwriting flash memory chunks, namely, the wireless router destructively overwriting the first version of router firmware in the flash memory with the second version of router firmware, the destructive overwriting proceeding in a chunk-wise manner such that prior to being overwritten by all of the chunks the flash memory contains neither a complete copy of the first version nor a complete copy of the second version of the router firmware, and wherein the wireless router is configured to run whatever version of router firmware is in the router's flash memory after being rebooted; and (e) going live with upgraded firmware, namely, the wireless router rebooting, thereby making the firmware change(s) go live.

2. The wireless router upgrading method of claim 1, further comprising writing the flash memory and then writing a kernel memory, namely, the wireless router destructively overwriting the first version of router firmware in the flash memory with the second version of router firmware, and then writing a copy of content of the second version of router firmware to a kernel memory in a volatile RAM memory in the wireless router before going live with upgraded firmware.

3. The wireless router upgrading method of claim 1, further comprising writing both flash memory and a volatile RAM disk, namely, the wireless router destructively overwriting the first version of router firmware in the flash memory with the second version of router firmware, and also writing a copy of content of the second version of router firmware to a RAM disk in a volatile RAM memory of the router.

4. The wireless router upgrading method of claim 1, wherein the firmware image chunks have at least one predetermined executable order, namely, an order in which the chunks are arranged in an executable copy of the firmware image, wherein the step of receiving a responsive firmware image receives the chunks in a volatile RAM memory in the wireless router in an order which differs from the executable order, and wherein the method comprises re-ordering the chunks such that the step of destructively overwriting flash memory chunks arranges chunks in the flash memory in the executable order.

5. The wireless router upgrading method of claim 1, wherein the firmware image has a size and the flash memory has a storage capacity, and the method further comprises the step of the wireless router checking to see whether the size of the firmware image is less than a predetermined maximum firmware image size, and the predetermined maximum firmware image size is at least two chunk sizes smaller than the flash memory storage capacity.

6. The wireless router upgrading method of claim 1, further comprising the step of the wireless router remapping a ROM memory address in the router to a RAM memory address in the router.

7. The wireless router upgrading method of claim 1, further comprising the step of the wireless router decompressing data held within the flash memory in the router and copying the data to a RAM-based file system in the router.

8. The wireless router upgrading method of claim 1, further comprising the steps of:

before going live with upgraded firmware, the wireless router overwriting at least a portion of the flash memory with user-definable configuration settings from a text file; and after going live with upgraded firmware, the wireless router overwriting the text file with the configuration settings from the flash memory.

9. The wireless router upgrading method of claim 1, wherein the response includes an indication that a billing status is inactive, and the method further comprises redirecting a web browser to a billing activation page.

10. The wireless router upgrading method of claim 1, wherein the firmware image chunks have at least one predetermined executable order, namely, an order in which the chunks are arranged in an executable copy of the firmware image, wherein the step of receiving a responsive firmware image receives the chunks in the wireless router in an order which differs from the executable order, and the method comprises re-ordering the chunks such that the step of destructively overwriting flash memory chunks arranges chunks in the flash memory in the executable order, and the method also comprises writing a copy of the chunks to a kernel memory in the wireless router.

11. A remotely upgradable wireless router, comprising:
a processor;
a volatile RAM memory in operable communication with the processor and containing a kernel, the kernel including data and including instructions which upon execution by the processor at least partially control operation of the wireless router, the kernel in particular containing a flash memory device driver;
a network interface card connectable to a TCP/IP network for two-way data communication of the wireless router with a remote server, the network interface card in operable communication with the volatile RAM memory;
a wireless link interface connectable to a wireless network for two-way data communication of the wireless router with a local computer, the wireless link interface in operable communication with the volatile RAM memory;
a flash memory in operable communication with the processor by use of the flash memory device driver, the flash memory containing a version of wireless router firmware, the wireless router firmware including data and including instructions which upon execution by the processor at least partially control operation of the wireless link interface, the flash memory having a storage capacity, the wireless router firmware image including a plurality of chunks, each chunk having a size which is no greater than a predetermined chunk size and is less than one-eighth the flash memory storage capacity;
the wireless router further characterized in that upon execution of at least some of the instructions by the processor, the wireless router will do the following:
receive over the network interface from the remote server a wireless router firmware image,
write content of the wireless router firmware image to the flash memory,
write content of the wireless router firmware image to the kernel memory after writing the content to the flash memory, and then
reboot, thereby passing control to at least some of the wireless router firmware content that was written to the flash memory.

12. The remotely upgradable wireless router of claim 11, wherein the wireless router upon execution of at least some of the instructions by the processor destructively overwrites the version of wireless router firmware in the flash memory in a chunk-wise manner with chunks of the wireless router firmware image.

13. The remotely upgradable wireless router of claim 11, wherein the wireless router firmware image includes a plurality of chunks which have at least one predetermined executable order, namely, an order in which the chunks are arranged in an executable copy of the wireless router firmware image, and wherein the wireless router upon execution of at least some of the instructions by the processor receives the chunks in the RAM memory in an order which differs from the executable order, and re-orders chunks to arrange the chunks in the flash memory in the executable order.

14. The remotely upgradable wireless router of claim 11, further comprising a ROM memory address remapped to a RAM memory address in the router.

15. A system comprising the remotely upgradable wireless router of claim 11 and a text file containing user-defined configuration settings, wherein the flash memory contains a copy of the user-defined configuration settings.

16. The remotely upgradable wireless router of claim 11, wherein the wireless router firmware image has a size, and the size of the wireless router firmware image is at least two chunk sizes smaller than the flash memory storage capacity.

17. The remotely upgradable wireless router of claim 11, wherein the wireless router upon execution of at least some of the instructions by the processor performs authentication to verify validity of the wireless router firmware image.

18. The remotely upgradable wireless router of claim 11, wherein the wireless link interface conforms with at least one 802.11 standard for wireless communications.

19. The remotely upgradable wireless router of claim 11, further comprising a 10/100 Mbps local area network interface card to provide a data communication connection to a local area network, the kernel including instructions which upon execution by the processor at least partially control operation of the local area network interface card.

20. The remotely upgradable wireless router of claim 11, wherein the kernel comprises open source operating system code.

\* \* \* \* \*